United States Patent [19]

McIntosh

[11] Patent Number: 5,103,404
[45] Date of Patent: Apr. 7, 1992

[54] FEEDBACK FOR A MANIPULATOR

[75] Inventor: James L. McIntosh, Westminster, Colo.

[73] Assignee: Tensor Development, Inc., Westminster, Colo.

[21] Appl. No.: 453,325

[22] Filed: Dec. 20, 1989

Related U.S. Application Data

[63] Continuation-in-part of Ser. No. 805,719, Dec. 6, 1985, abandoned, and a continuation-in-part of Ser. No. 131,991, Dec. 11, 1987, Pat. No. 4,891,764.

[51] Int. Cl.$^5$ .............................................. B25J 13/00
[52] U.S. Cl. ................................. 318/568.22; 414/5; 901/9; 901/34; 395/95
[58] Field of Search ............... 364/513; 318/628, 566, 318/568, 569, 600, 632, 568.11, 568.16, 568.22, 568.23; 901/9, 20, 33, 34, 38, 49, 50; 414/1, 2, 4, 5

[56] References Cited

U.S. PATENT DOCUMENTS

| | | | |
|---|---|---|---|
| 3,608,743 | 9/1971 | Mosher et al. | 414/5 |
| 4,362,978 | 12/1982 | Pollard et al. | 318/632 |
| 4,506,335 | 3/1985 | Magnuson | 364/513 |
| 4,510,428 | 4/1985 | Dunne | 364/513 |
| 4,603,284 | 7/1986 | Perzley | 364/513 |
| 4,604,559 | 8/1986 | Hawkes et al. | 364/513 |
| 4,621,332 | 11/1986 | Sugimoto et al. | 364/513 |
| 4,655,673 | 4/1987 | Hawkes | 414/5 |
| 4,661,032 | 4/1987 | Arai | 364/513 |
| 4,706,001 | 11/1987 | Nakashima et al. | 901/49 |
| 4,769,583 | 9/1988 | Goor | 318/569 |
| 4,772,831 | 9/1988 | Casler, Jr. et al. | 364/513 |
| 4,860,673 | 8/1989 | Seraji | 364/513 |
| 5,023,808 | 6/1991 | Seraji | 364/513 |

Primary Examiner—Salvatore Cangialosi
Attorney, Agent, or Firm—Sheridan, Ross & McIntosh

[57] ABSTRACT

A programmable variable degree of tactile feedback for the operation of a manipulator by a pair of motors, one connected to the load and one to the control. Computer controlled four quadrant regulators for each motor are used to drive the load motor shaft to the same position as the control motor shaft and to vary the feedback force on the control motor in proportion to selected forces developed during the manipulation process.

17 Claims, 21 Drawing Sheets

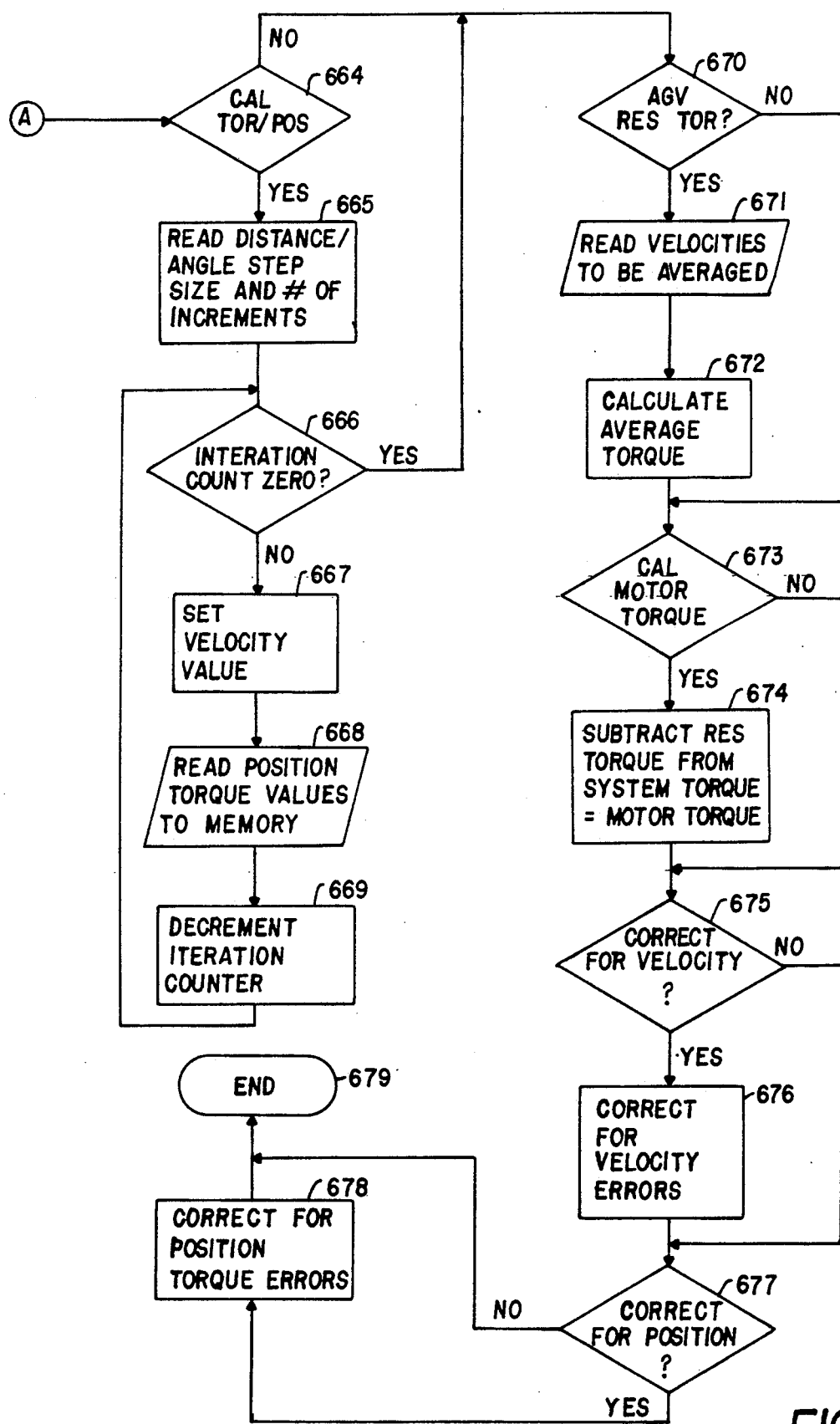
FIG. 18.b

FEEDBACK FOR A MANIPULATOR

BACKGROUND OF THE INVENTION

This application is a continuation-in-part of U.S. patent application Ser. No. 805,719, filed Dec. 6, 1985 now abandoned and U.S. patent application Ser. No. 131,991, filed Dec. 11, 1987 now U.S. Pat. No. 4,891,764.

FIELD OF THE INVENTION

The invention relates to manipulator control systems and, more particularly, to a system for providing a programmable variable degree of tactile feedback for the operator of the manipulator.

HISTORY OF THE PRIOR ART

Manipulator devices in which an operator moves a control mechanism causing a remotely positioned manipulator to perform certain mechanical functions have long been a part of the prior art. Virtually every servo-mechanism control system from robotic manipulators for handling highly radioactive materials at safe distances from an operator, to flight control in aircraft utilize the same basic principles. In the earlier systems there was no relationship whatsoever between the degree of force required for the operator to actuate the control mechanism and the force actually applied by the remotely located manipulator. As a result, it took a substantial period of time for an operator to become trained to use such a system in that the operator could not rely upon the "feel" of the control mechanism but, rather, only upon the observed effect which occurred as a result of the manipulator action. Very often, insufficient or excess movement of the control mechanism was usual and rapid reaction to emergency conditions were severely limited, requiring a number of cycles of action, observation and reaction in order to bring the manipulator to the precise position of level of control desired by the operator.

In later versions of actuator control servomechanism systems, some degree of operator tactile feedback has been included. However, the degree of tactile feedback response is often a fixed value which is preselected by the original designer. As a result, there is no way in which individuals having varying degrees of sensitivity and varying degrees of force/reaction characteristics can vary the fixed degree of tactile feedback and optimize their own degree of sensitivity and control over the manipulator.

It is clearly a desireable feature in a randomly controlled, or even automatically controlled, manipulator for the operator or programmer to know the forces which the manipulator places on the manipulated object or mechanism. It is also desireable to know the forces the manipulated object (load) places on the manipulator. These forces often are random in time, amplitude and direction and so must usually be determined by measurement rather than predetermined correction methods. In some instances, total system forces, that is the algebraic sum of both the forces developed by the load and the forces developed by the manipulator might provide the most appropriate representation of what an operator feels when manually grasping an object. In other instances the forces output to or by the load provides the most natural representation of tactile forces in remote manipulation processes. Sometimes no single parameter provides the most appropriate tactile feedback, and a blend of the parameters might be used. As the manipulation operation proceeds, the most appropriate feedback parameters might also change. Thus the forces or force blend used as arguments for tactile feedback might need to be modified when certain events occur, such as making contact with an external object or switching from static to dynamic operation.

Various prior art systems have attempted to approach this problem. For example, in U.S. Pat. No. 4,360,886 to Kostas there is disclosed a system for determining the feasibility of a robotic manipulator which measures only displacement of the manipulator and not the force values. In U.S. Pat. No. 4,517,653 to Tsuchihashi there is a system which measures displacement of a control mechanism but uses this value to control multiple identical manipulators rather than provide an indication of the degree of forces of any one of the manipulators. In a similar attempt, U.S. Pat. No. 4,362,978 to Pollard discloses the use of strain gages to measure the force on a remote manipulator and the provision of a look-up table to factor out the inertia values of the machine itself to attempt to arrive at a true value of forces exerted by the manipulator. Similarly, U.S. Pat. No. 4,621,332 to Sugimoto discloses a system which uses for force signals and a force reference value to calculate a command velocity for moving a robotic hand-like manipulator. Other systems are known which use very high speed computers (supercomputers) and strain measuring devices to provide some degree of tactile feedback for the operator.

None of the systems are able to provide sensory input to an operator of a remote manipulator which gives in real time, an accurate and reliable, as well as variable, degree of tactile feedback to the operator to enhance the preciseness of his control over the manipulator. Such a degree of control is often necessary to avoid overcompensation and undue time required to achieve the desired action of the manipulator.

SUMMARY OF THE INVENTION

The system of the present invention utilizes a pair of motors for each degree of freedom of the manipulator. The current through the motor for electro-magnetic motors, or the voltage applied to the motor for piezo-motors, controls the forces produced by the motors. Depending upon the motor type, one of these parameters is set by a processor controlled four quadrant regulator. One of the motors, used to provide tactile feedback force, is connected to the operator manipulated control. A second, load connected motor, actuates the manipulator. The motion of this motor, is determined by either operator controlled movements of the control motor or preprogrammed motion instructions. Generally, encoders on both of the motors in a pair determine the position to which the operator has moved the control shaft attached to the control motor and also the position of the shaft of the load motor. A force value based upon the timed difference between the load motor encoder and the control motor encoder is fed to the manipulator load connected motor such that the manipulator motor is driven to its desired position as determined by the control motor, or in some cases, preprogrammed instructions. Selected forces resulting from either the forces developed by the load motor, the forces developed by the load, system forces, or a selected blend of two or more force parameters are calculated, scaled and fed to the control motor providing a highly accurate tactile feedback force to the operator indicative of the level of selected forces developed while operating the remote manipulator.

In other modes, system force information is used to dynamically weight the load and/or measure grasped load dimensions.

In selected circumstances, load dimension measuring might be accomplished by using system forces, together with elapsed encoder counts from a reference, to determine the physical dimensions of the grasped load. Load mass determination might be accomplished by setting known torques/forces to the load motor and using the resulting accelerations to determine the mass of the grasped load.

As can be seen from the preceding discussion, the system provides a readily programmable degree of coupling between the two motors of each pair, insuring accurate and precise real time tactile feedback to the operator as well as allowing for dimensional measurement or dynamic weighing of the grasped load.

BRIEF DESCRIPTION OF THE DRAWINGS

For a more complete understanding of the present invention and for further objects and advantages thereof, reference may now be had to the following detailed description taken in conjunction with the accompanying drawings, in which:

FIGS. 18a–18b constitute a flowchart describing the procedure for final motor calibration;

DETAILED DESCRIPTION OF THE PREFERRED EMBODIMENT

Figure 1:
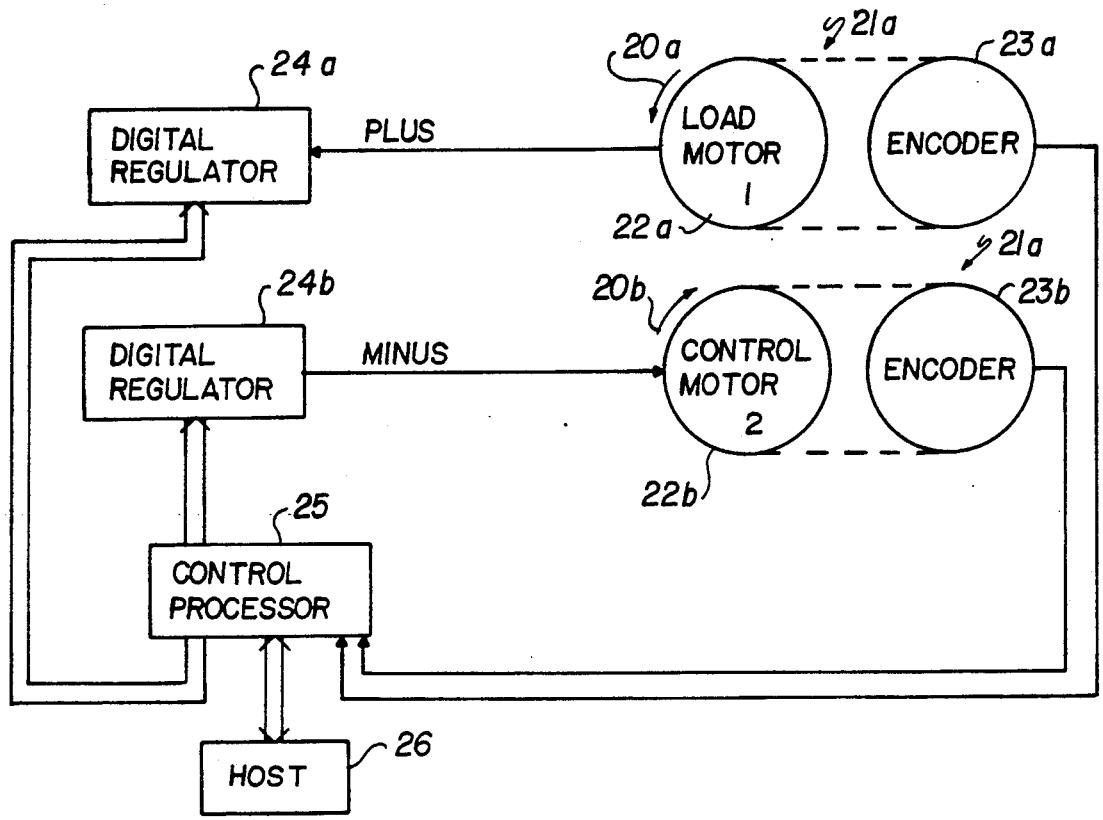
FIG. 1 is a block diagram of a system for providing operator tactile feedback for an electric manipulator in accordance with the teachings of the present invention.

Referring first to FIG. 1, there is shown a block diagram of a system for providing operator tactile feedback for an actuator manipulator constructed in accordance with the teachings of the present invention. The system includes a first load motor/encoder assembly 21a comprising a load motor driving the manipulator with a load encoder 23a which constantly monitors the angular position of the shaft of the load motor 22a. Similarly, there is included a control motor/encoder assembly 21b comprising a control motor 22b to which is mounted a control encoder 23b which precisely follows the angular position of the control motor shaft 22b. The load motor shaft 22a is connected to the manipulator actuator (not shown) to drive the actuator to accomplish the end function. The control motor shaft 20b is connected to the tactile control mechanism actuated by the operator (not shown) and provides a force of resistance against that control mechanism to develop tactile feedback indicative of the level of selected forces developed while operating the manipulator actuator. The load motor 22a is connected to a digital four quadrant regulator 24a, which is capable of either setting a precise value of current or voltage to the motor. In the event that the motor 22a is acting as a generator rather than a motor, the regulator is capable of sinking as well as sourcing current, thereby enabling the load motor 22a to completely control the forces developed by the manipulator for the axis in which the motor moves. Similarly, the control motor 22b is connected to a digitally controlled four quadrant regulator 24b. The output from the load encoder 23a is connected to decoding logic, which might be incorporated in a integrated circuit such as a IXSE 501 manufactured by the IXYS corporation or could be composed of discrete logic gates using logic design techniques well known to those skilled in the art. The output from the decoding logic then goes to control processor 25. The output from the control encoder 23b is also connected to decoding logic and then to the control processor 25. The control processor 25 is connected to and digitally controls each of the programmable regulators 24a and 24b so as to precisely regulate the current or voltage and thereby the torque supplied to both of the motors 23a and 23b. The control processor 25 may also be connected to a host computer 26 for storage of data and programming used in the operation of the control processor 25. As can be seen from FIG. 1, the system of the present invention utilizes two motors 22a and 22b, each having a position encoder 23a and 23b attached to each individual motor, respectively. Both of the shaft encoder blocks 23a and 23b are connected to the control processor 25. Each encoder block has separate counter and direction decoding circuitry for monitoring its respective direction of rotation and angular position. The control processor selects and periodically interrogates each encoder block for position information. The control processor 25 is also connected to the host computer 26 which may be any suitable computer system connected to interface with the control processor 25. The control processor 25 is also connected by a common bus to the two digitally controlled regulators 24a and 24b. The current or voltage output by the respective regulators 24a and 24b is adjusted by the microprocessor 25 such that load motor shaft 22a is driven to the same position as the control motor shaft position, while tactile feedback force is applied against the operator manipulated control by the motor 22b. The feedback force developed by control motor 22b is maintained precisely by the regulator 24b, while the force necessary to drive the load motor to the position set by the control motor or preprogrammed instructions, is maintained precisely by regulator 24a. In some cases the same digital word may be fed to each regulator 24a and 24b by the control processor 25, thus producing an exact ratio of force between the two motors 22a and 22b dependent upon the torque constant of each motor. Usually, the force ratios between the two motor 22a and 22b will be varied as a function of system forces, load forces, load motor forces, or a selected blend of these forces, such variation being controlled by the control processor 25 in order to achieve system force feedback to the control motor and thereby to the operator.

The control motor 25b usually will have the smaller value of force and is connected by mechanical means (not shown) and which may vary depending upon the particular application, such that the operator can hand-rotate the motor shaft as the operator control of the manipulator is being effected. The load motor 22a, which may or may not be located remotely from the first motor 22b, is physically connected to the load which is intended to be moved and controlled by the load motor 22a.

The position count from both the encoders 23a and 23b is periodically read by the control processor 25 and one value is subtracted from the other to determine if there is a difference between the two. This is done on a precisely timed, periodic basis. Whenever any significant difference occurs between the two encoder values, the microprocessor outputs a signal to the load motors 22a of a polarity such that if the control motor encoder 23b is held stationary, the load motor 22a will be moved to minimize the position error. The value of the current or voltage fed to the motor 22a is proportional to the timed error between the two encoder counts. The above mentioned time interval is quite long compared to the clock cycle of the processor. This allows the control processor to determine and set the torque of load motors 22a before the time period elapses. Usually, in the wait time before this timed event occurs, the processor 25 calculates the system forces developed while operating the system and sets the force of the control motor such that the operator feels the selected forces at the control motor. The calculation and setting of control torque takes second priority over setting load motor torque and is interrupted when the time interval flag is set. Thus the load motor torque is set every time increment, but more than one time increment is needed to set control motor torque. The update time of the control microprocessor 25, as compared to a human operator response time, is such that the user feels a virtually continuous tactile feedback force applied to the operator by the control motor 25b which is directly indicative of the selected forces developed while operating the system.

The physical connection between the motor shaft manipulated by the operator and attached to the control motor 22b and the motor shaft connected to the load, i.e. the shaft of load motor 22a, may be the same or they may be different or they may be generically the same, but have different size ratios.

The force information imparted to or induced by the load usually is also output to the host computer 26. This information may be used for force profile storage purposes or for a CRT visual feedback indicative of the forces applied to, induced by the load, or both. The system of the present invention is particularly adapted for utilizing a human operator to perform a sequence of operational forces applied to the control motor 22b and store them in the host processor 26 so as to effectively train a robotic operator to perform the same sequence of control actuation automatically. This information might also be used to dynamically weight the load being manipulated or determine the physical size and/or spatial orientation of the object where the manipulator touches the load.

Although the above system in FIG. 1 is illustrated as being in a single plane of motion, it should be clearly understood that with proper gimballing and multiple motor/processor units, multiple planes of motion are readily configured using multiples of the system described in FIG. 1.

Figure 2:
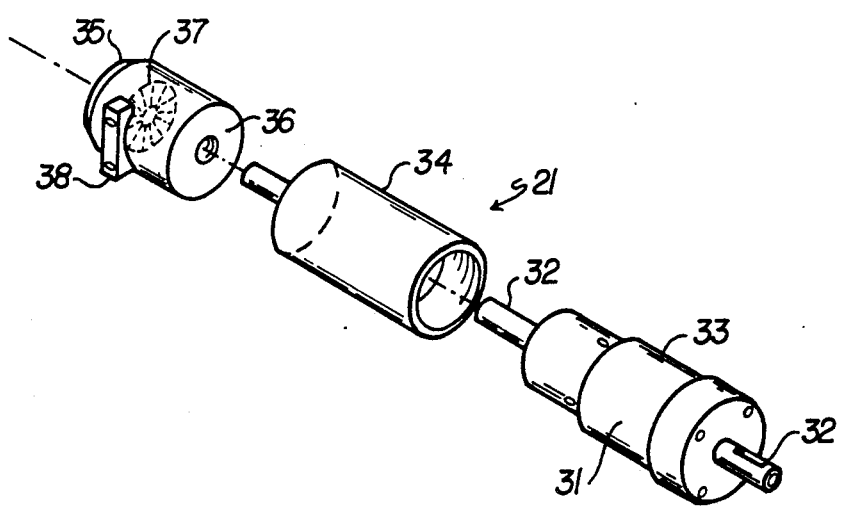
FIG. 2 is an exploded perspective view of a program controlled motor assembly for each of the assemblies included as part of the system shown in FIG. 1.
Figure 3:
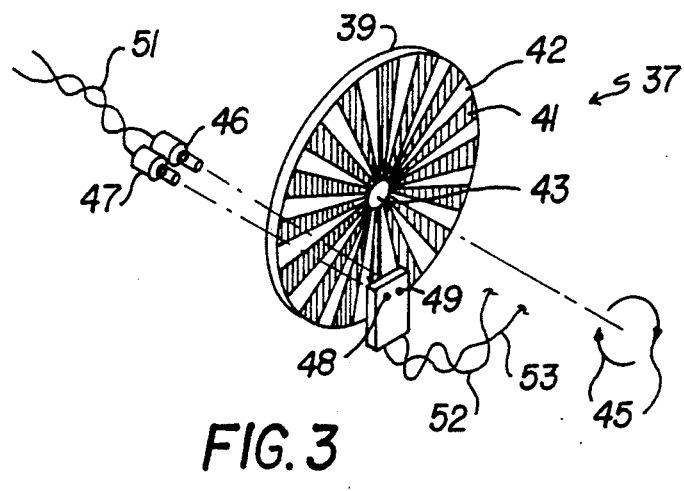
FIG. 3 is an exploded perspective view of an optical position encoder for each of the motor assemblies employed in FIG. 1 and shown in FIG. 2.

In the system of the present invention, both system forces and position information are referenced to the joint which is controlled by control processor 25. Using rotational/translational transforms for position information and jacobean matrices to describe force information, multiple plane systems can be reduced to one frame of reference using methods well known by those skilled in the art. However, knowing total system forces provides all the force information needed to correct position errors caused by deflection and also to determine the total stress in each component of the manipulator. Normally this information is used in a one to one manner to provide tactile feedback to the manipulator operator, and additional transformations/rotations are not needed in real time for system operation. Only when the control-load orientations or control-load dimensions differ, are the above mentioned additional transformational/rotational computations necessary. Each of the memory systems shown in FIG. 1 requires two motor and angular position encoder assemblies, as well as two digitally programmable four quadrant regulators. Such a motor and encoder assembly for both the control motor 22b and the load motor 22a are shown in FIGS. 2 and 3. In subsequent discussions only one motor, encoder and regulator will be mentioned although it is understood one set is necessary for each motor. A control processor, host computer and other common equipment may be shared by the subsystem for each motor. In applications where very high thru-put is needed, two processors might operate in parallel, one setting load motor torque, while the other sets control motor torque. In other applications using piezo motors, where voltage rather than current controls the actuator force, multiple motors might be controlled by one processor. The inherent capacitance of the piezo actuator is such that the applied voltage might be periodically rather than continuously monitored and controlled.

ANGULAR POSITION ENCODER

Referring next to FIG. 2, there is shown an exploded perspective view of an encoder and motor assembly 21 used in conjunction with the present invention. As discussed above, the position encoder should be mounted on the motor shaft as near to the motor as practical. In applications of the present system where there is essentially no compliance or backlash between the motor and the load, using only one encoder mounted directly adjacent to the motor does not contribute to any significant errors. The exemplary motor and encoder assembly of FIG. 2 is intended for such an application. In other instances where shaft compliance is significant, two encoders, one next to the motor housing and one next to the load may be necessary.

The assembly of FIG. 2 includes a permanent magnet DC motor 31 having a rotary shaft 32 extending axially through a cylindrical housing 33 within which permanent magnet field assemblies are located. The motor housing 33 is mounted within a cylindrical shell 34.

The motor assembly 21 also includes a shaft angular position encoder sub-assembly 35 including a housing 36 which axially receives the motor 32 to the end of which is affixed an angular position encoder 37. The angular position encoder 35 includes a mounting flange 38 by means of which the other components of the system may be attached. One embodiment of the shaft angular displacement position encoder 37 is shown in FIG. 3.

In FIG. 3 there is shown a circular disc 39 having a plurality of radially outwardly extending angularly divided opaque area 41. Each opaque area 41 is separated by a transparent or open area 42 and the center 43 of the disc 39 is mounted to the end of the shaft 32 of the motor 31. The motor shaft and disc 39 can rotate in either clockwise or counterclockwise directions as is represented by arrow 45. A pair of light sources 46 and 47 are positioned to one side of the disc 39 while a pair of photocells 48 and 49 are mounted in aligned positions on the opposite side of the disc 39. The light sources 46 and 47 are energized via wires 51 so that light passes through the transparent or open area 42 and is blocked by the opaque areas 41. As the disc 39 is rotated, pulses are generated by the light sensors 48 and 49 over their respective leads 52 and 53 leading to the control system within the control processor 25. These pulses are stored in an electronic counter in the control processor 25, which allows determination of how far and how fast the motor shaft rotating the disc 39 has moved relative to the motor housing. One of the light sensors 48 is slightly ahead of the other light sensor 49 so that the rotation of the disc 39 in one direction produces a different pulse phasing than shaft angular rotation in the other direction. The lines on the optical encoder disc 39 are preferably formed at 0.01 degrees of arc from one another to provide a very high degree of resolution of the angular position of the shaft 32 of the motor 31. In other embodiments, the angular position encoder for the motor shaft may include other types of angular position sensing means such as Hall Effect devices which sense the movement of a magnetized area and provide similar angular position displacement encoding for the output motor shaft 32 of the motor 31.

This embodiment using conventional DC permanent magnet motor/circular shaft encoder combinations is preferably used when the large physical size and weight of this type motor is acceptable. In some applications the motor/encoder must be quite small. Applications in which arrays of motor/encoders are placed on a surface to give better definition, such as on the fingers of a data glove or the gripping surface of a manipulator, cannot be present technology electromagnetic motors due to size constraints. For these uses piezo electric motor/linear encoder combinations are preferable.

Figure 4:
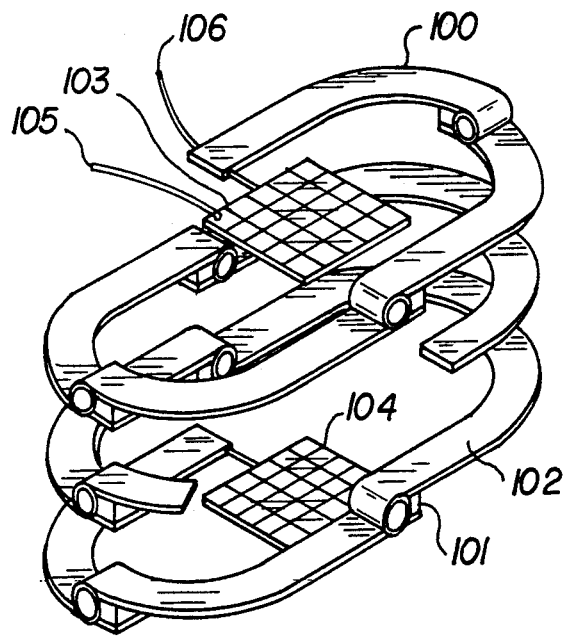
FIG. 4 is a perspective view of a piezo electric linear motor encoder assembly.

Referring to FIG. 4, there is shown an embodiment of such a piezo motor-linear encoder device 100. The motor consists of a series of piezo translators 101 placed in the fulcrum of a series of curved levers 102 connected one to another such that an oval shaped actuator/lever assembly 100 is created. Each of the individual actuators in the assembly is connected to a digitally controlled powered supply (not shown) operated in the voltage mode. The levers 102 serve to increase the distance moved by each actuator and are curved to decrease the area occupied by the actuator. The levers are constructed such that a considerable degree of compliance is introduced to the system. The piezo actuators are relatively rigid so the spring rate of the levers is used to provide a mechanism which converts the physical change in actuator size into a change in force.

Fiber optic cables are connected to the side 105 and center 106 of the top plate 103 and bottom plate 104 of the actuator.

Figure 5:
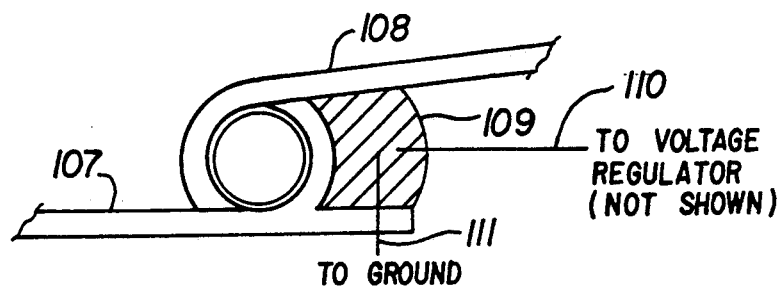
FIG. 5 is a close up view of the piezo actuator/lever arm assembly connections.

Referring now to FIG. 5, there is shown a close up view of the actuator/lever configuration. The supporting lever 107 and action lever 108 are configured as hinges such that the action lever 108 is forced to rotate upward when voltage is applied to the piezo actuator 109. The lever/actuator assemblies are concatenated one to another so that the change in length per volt although small for each assembly is quite large for the entire actuator. A wire 110 is connected to each individual actuator 109 and also to a voltage regulator (not shown). The circuit is completed by another wire 111 which is grounded.

Figure 6:
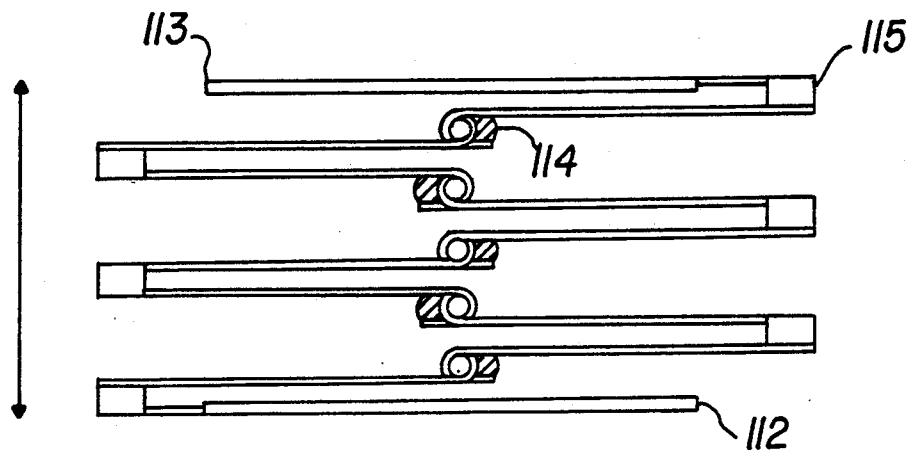
FIG. 6 is a side view of the actuator assembly.

FIG. 6 illustrates the appearance of the actuator as viewed from the side. The bottom plate 112, supports the actuator assembly. While the Top plate 113 contacts the object to be gripped. Piezo actuators 114 and 115 provide linear motion in the plane shown by the arrow.

Figure 7:
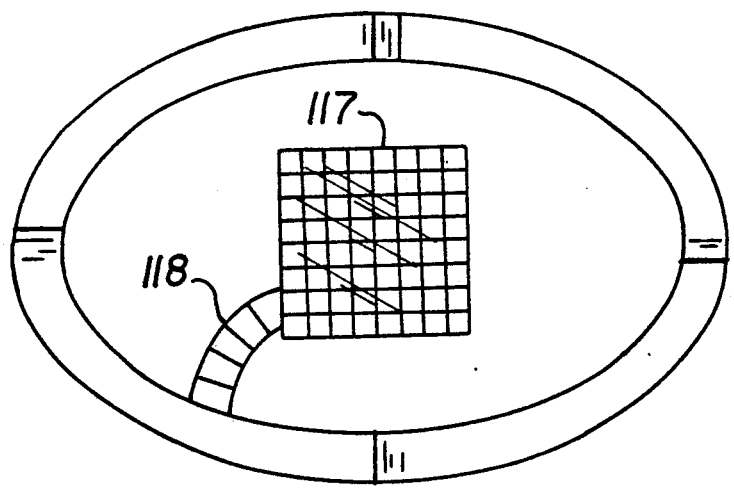
FIG. 7 is a top view of the actuator assembly.

FIG. 7 shows the actuator as viewed from the top. The top plate 117 is held parallel to the bottom plate (covered by the top plate in this view) by separately powered curved actuators 118.

Figure 8:
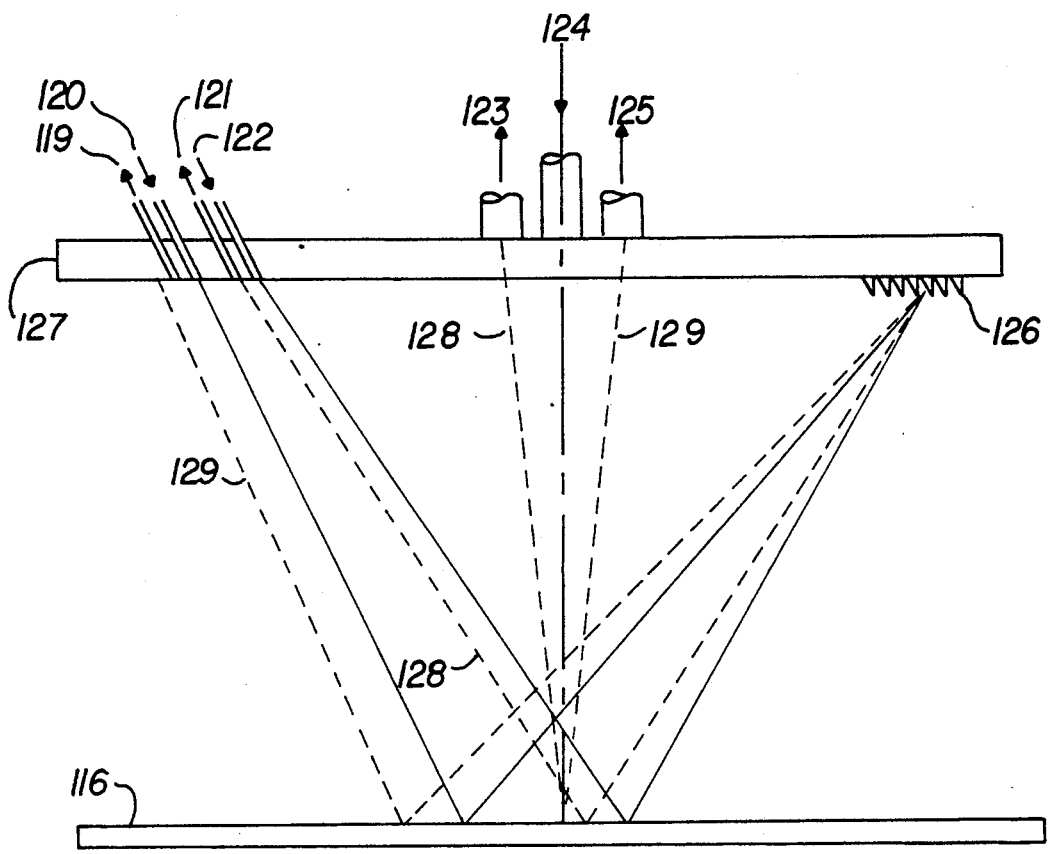
FIG. 8 illustrates the positioning of the fiber optic/prism encoder assemblies.

FIG. 8 illustrates the placement of the fiber optic and prism assemblies which provide distance determining functions. Inside the oval as shown previously in FIG. 4 are fiber optic connected laser/receptor devices 119 to 125 which in conjunction with prisms 126 provide the linear encoder functions.

Second and third fiber optics 120, 122 are connected to an external light source (not shown) and also to the actuator surface 127 which contacts external objects. The fibers are mounted to the actuator surface at a precise angle. This light is reflected by the mirrored surface which forms the bottom 116 of the assembly to prism assembly 126, which reflects the light back to receptor fiber optics 119,121. The prisms in prism assembly 126 are shaped such that only one pulse of light is reflected per prism position as shown by the dotted lines 128,129 representing the light returned by the prisms 126. This gives one received light pulse indicating passing or reaching a known distance while the actuator assembly is compressed or expanded, and a second pulse, indicating the direction of motion. Thus, the distance moved by the actuator, is indicated by a series of light pulses converted to electric pulses similar to those provided by the shaft encoder. The direction is indicated by the phase of each pulse again similar to the shaft encoder.

As the actuator as a unit elongates or shortens, the top actuator plate angle also changes. If the two plates are not parallel, the distance measurement is inaccurate. To correct for this, a series of actuators 118 of FIG. 7 are connected to the top plate such that the applied voltage might be adjusted to keep the two plates parallel. Alternatively the voltage might be held constant and the number of actuators with voltage applied might be incremented or decremented such that the plates are kept parallel. One fiber optic 124 connected to a light source (not shown) is pointed straight down. Fibers optics 123,125 are connected to receptors are closely positioned on each side of the light source. If the top-bottom plate orientation deviates from being parallel by some very small preset amounts, the light from the transmitting optic 124 is reflected as shown by dotted lines 127,128 such that one of the receiving optic fibers 123,125 is illuminated. This provides feedback for the angle maintenance piezo actuators 118 of FIG. 7, and allows the angle maintenance voltage regulator (not shown) voltage to be adjusted to keep the top plate 127 of the actuator system parallel to the bottom reflective plate 128 as evidenced by no light being reflected to either receiving fiber optic 123,125. If either optic is receiving light, a flag, indicating the actuator plates are out of alignment might be set. The voltage needed to align the plates might also be used to provide information about the angle of the force vector n the actuator.

Figure 9:
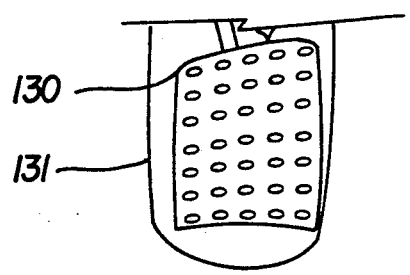
FIG. 9 illustrates the positioning of the actuators on a contracting or gripping surface such as a data glove.

FIG. 9 illustrates how an array of actuators 130 might be arranged on the surface of the gripping portion of a remote manipulator 131. The actuators are held in place by a compliant substance. Generally the voltage applied to the load actuator is set such that the forces produced by the actuator and the compliance of the surface holding the actuators are balanced in the absence of external forces. That is the load actuator system forces as referenced to the surface in which they are embedded generally are zero until contact is made with a external object. The voltage applied to control actuator is set such that the operator feels selected forces as determined by system operation.

PROCESSOR CONTROL

Figure 10:
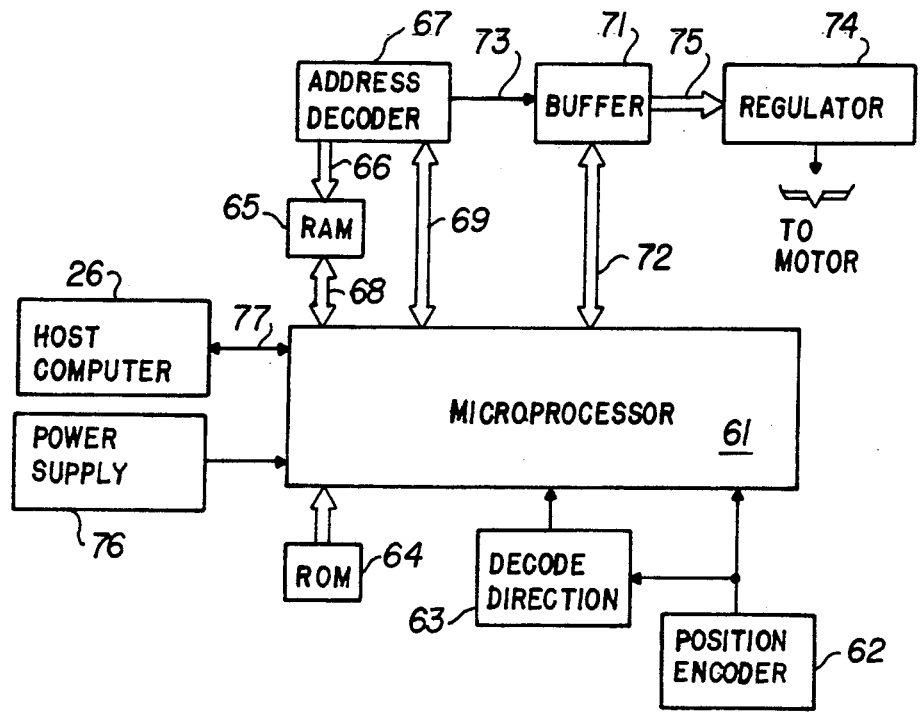
FIG. 10 is a block diagram of the microprocessor controlled elements for each motor in the system of the present invention.

Referring next to FIG. 10, there is shown a block diagram of the microprocessor controlled elements of one embodiment of the system of the present invention which includes a microprocessor 61, which might be any one of a large number of digital processing devices now available. In one embodiment of the system of the present invention a Model Super Z8 Processor manufactured by Zilog was used to substantial advantage. Such a processor may include some of the other elements shown as separate components of the block diagram in FIG. 4, however, these elements may be included as separate components if other processing devices are used to implement the system of the present invention. The microprocessor 61 is connected to receive angular position displacement information from a position encoder data unit 62 and angular direction data from a direction decoding unit 63. A read-only memory (ROM) 64 provides a preprogrammed control data for the microprocessor 61. Similarly, random access memory (RAM) 65 is available to the microprocessor 61 through bus 66 to both store and recall processing information. An address decoder 67 is connected to the RAM 65 through a bus 68 and to the microprocessor 61 through a bus 69. A buffer memory register 71 is connected to the processor 61 through a bus 72 and to the address decoder via data line 73. The contents of the buffer 71 are communicated to the digitally controlled register 74 via a bus 75. The regulator precisely controls current flow through, or voltage applied to the motor. The microprocessor 61 is usually in constant communication with the host computer via a communication port which may include a conventional communications module such as RS-232 interface. The power supply 76 is shown to provide a separate power for the RS-232 interface included as part of the microprocessor 61 when the Super Z8 is employed or a similar implementation is used.

In general, the microprocessor 61 is in constant communication with the host computer 26 via some type of interface to receive program instructions as well as provide a operator communications link. In some applications, the microprocessor may also operate in a stand-alone mode, and only use a host computer for initial program input. Data stored in the ROM memory 64 sequences the processor 61, as will be further discussed below, to receive position encoder data from unit 62 and decoder direction data from unit 63, and also to perform calculations thereon in order to determine either the displacement, velocity, or acceleration of the motor output shaft at periodic intervals. The processor 61 also selects, in accordance with preprogrammed instructions or in accordance with its calculations based upon the position encoder and time data, a digital number and supplies it through buffer 71 and bus 75 to the digitally controlled regulator 74. This digital number defines a precise value of current or voltage which will be set by the programmable regulator 74, and thus establish a precise preselected value of torque to be placed on the output shaft of the motor.

By first setting the value of the current voltage to be supplied to the memory by the programmable current regulator 74, and therefore the torque produced, then calculating the value of acceleration produced in the output shaft of the motor based upon data from the position displacement encoder unit 62, the microprocessor 61 is capable of determining the exact value of the force resisting the rotation of the output shaft. This concept of using a microprocessor and digital programmable regulator to set a preselected value of torque developed by the motor, and then using the change in angular displacement of the motor shaft as a function of time to calculate the resisting torque to the motor shaft, is a fundamental function of the system in setting tactile feedback based on selected forces. In performing this function, the receipt of information by the microprocessor 61 from the encoder direction data unit 63 and the displacement encoder unit 62 is fundamental. A specific configuration and operation of the processor control circuitry of FIG. 4 can be divided into six functional blocks including a Super Z8 microprocessor chip 61, the ROM memory 64, the RAM memory 65, a direction logic 63, displacement decoding logic 62, and multiple tristate buffer logic 71. Also included is a −5 volt generating chip to power Universal Asynchronous Receiver/Transmitter (UART) within the Super Z8 microprocessor chip 61.

At start up the ROM memory 64 stores data to bootstrap the microprocessor 61 to receive serial data through the UART (included as part of the Super Z8 microprocessor 61) form the host computer 26. These data re input via a direct memory access function of the microprocessor to the RAM memory 65 connected to the microprocessor 61. The shaft direction decoding circuitry 63 sets a counter (contained within the Super Z8 microprocessor 61), to count up or down, depending upon the direction determined by the direction deciding logic 63. The counter accumulates pulses from the displacement decoding logic 62 and values in the counter are periodically read by the microprocessor 61 and stored in its stack registers or memory. In some instances the counter will be set to zero or some preselected number by all external signal to provide an absolute distance reference. The address decoding logic 67 actuates a selected tristate buffer which is connected to the programmable current source 74. At selected times the microprocessor 61 may be polled through the UART to send data to and from the host processor 26. The angular position data is read from the encoder counter 62 and the current/voltage data is read to the regulator 74 to set the torque developed by the motor.

MOTOR DRIVER CIRCUIT

Figure 11:
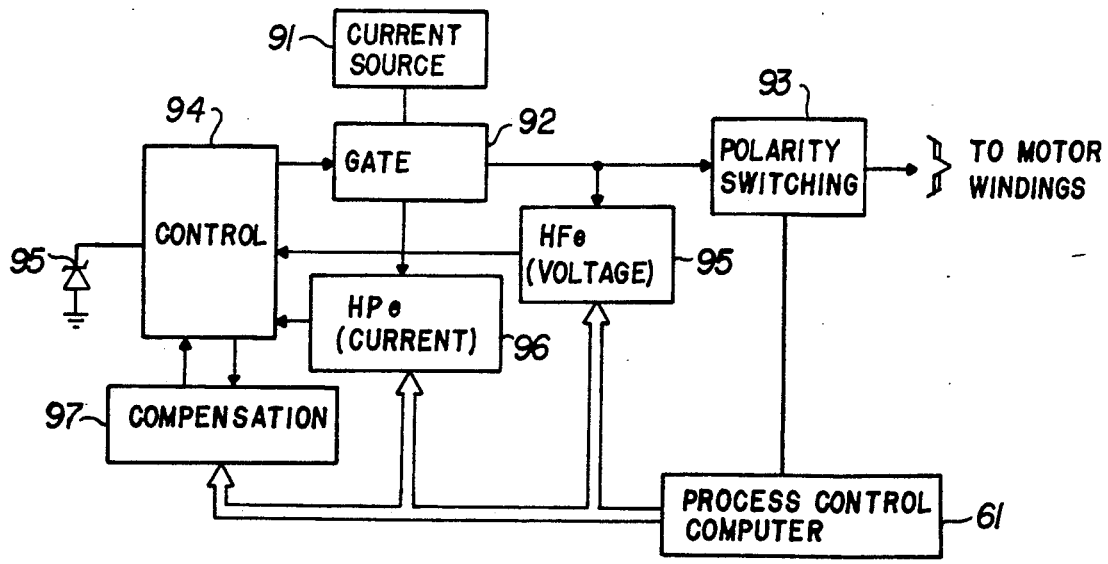
FIG. 11 is a block diagram of the process controller/motor controller system configuration.

Referring next to FIG. 11, there is shown a block diagram of embodiment of a configuration for effecting a stable current supply for driving a motor in current mode control in accordance with the invention. A source of electric current 91 is connected to supply current through a pass device 92 which couples the current through a polarity switching circuit 93 to the windings of the motor. The polarity switching circuit 93 changes the direction of the current flow through the motor in response to commands from the process from the process control computer 61. The pass device 92 may take a number of different forms including a gate such as a power switching transistor operated in either linear or switch mode, or it might include circuitry which would modify the current/voltage from the source in some way such as amplifying or degrading it in some fashion. The gate 92 formed of pass device shown operates in response to a control circuit 94 which is connected to a reference voltage 90. The feedback elements of the control system are divided into three parts: a proportional voltage feedback circuit Hfe (voltage) 95; a proportional current feedback Hfe (current) 96, and a gain and phase compensation circuit 97. Each of these feedback elements 95-97 operate under control of the process control computer 61 and provide signals to the control circuitry 94 to operate the current gate 92. The proportional voltage control 95 varies the division of the voltage output level, under control of the process control computer 61, and feeds back a selected proportion of the output voltage to the control circuit 94. The proportional current control 96 similarly provides a signal indicative of proportional division of current coming through the current gate 92 back to the control circuit 94, also under control of the process control computer.

The voltage feedback loop and current control loop of FIG. 11 is the only analog feedback employed in the system of the present invention and their uses are limited to within the confines of the motor drive circuit itself. That is, there is no analog feedback control used in the same sense it is employed in traditional servomechanism control systems.

In all feedback regulators compensation of the gain and phase of the feedback signal is required in order to maintain the stability of the regulator. In particular, there is usually employed a fixed value of compensation comprising a capacitor and/or resistors in some manner affixed to the operational amplifier that amplifies the error signal and which controls both the phase and gain of that signal to insure stability. However, when the feedback ratio is changed, a fixed compensation may no longer be ideal for the changed ratio and this can cause the regulator to become unstable during certain ranges of operation, e.g. when operating conditions require switching from high current-low voltage to high voltage-low current.

The circuitry of FIG. 11 allows the regulator compensation to be varied in accordance with the operating conditions. That is, rather than using fixed compensation in the feedback loop, the present circuitry employs compensation as a dependent variable so that it is optimally varied in such a manner as to maintain the stability of the system. As will be further explained below, one embodiment of the circuitry uses a bank of multiple capacitors and analog switches which are digitally controlled by the process control computer. By switching combinations of the capacitors in and out of the circuit the gain and phase compensation may be varied. The compensation can be varied upon changes in the value of the impedance seen by the regulator, due to changes in the counter EMF of the motor, as well as upon the value of the feedback. All of these potentially encounterable operating conditions are programmed into the process control computer 61 which automatically varies the compensation 97 in accordance with operating conditions. Thus, the system approaches an open loop in terms of stability compensation.

The process control computer switches into the circuit the required values of compensation which have been predetermined to create a stable operating environment based upon the values of current and voltage at any particular time. The system is also responsive to the angular velocity of the motor and the direction of the motor, to determine which bank of resistors and capacitors are used to set the optimum feedback compensation. Of course, whether or not the motor is acting as a motor or a generator is also an important consideration in varying the compensation for optimum performance.

Figure 12A:
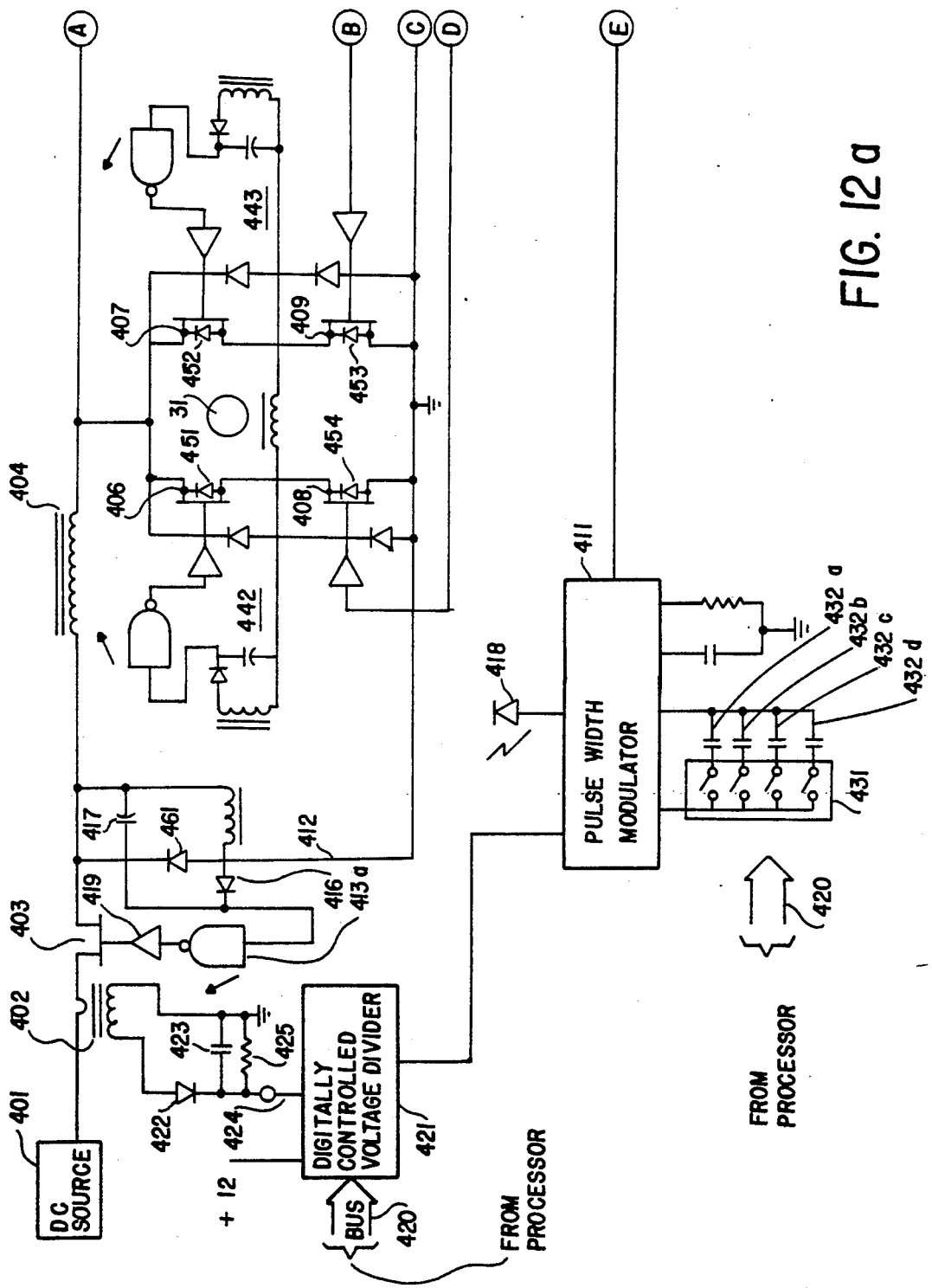
FIGS. 12a–12b constitute schematic diagram of a motor driven circuit for the FIG. 11 embodiment and is used for each of the motors used in the system of the present invention.
Figure 12B:
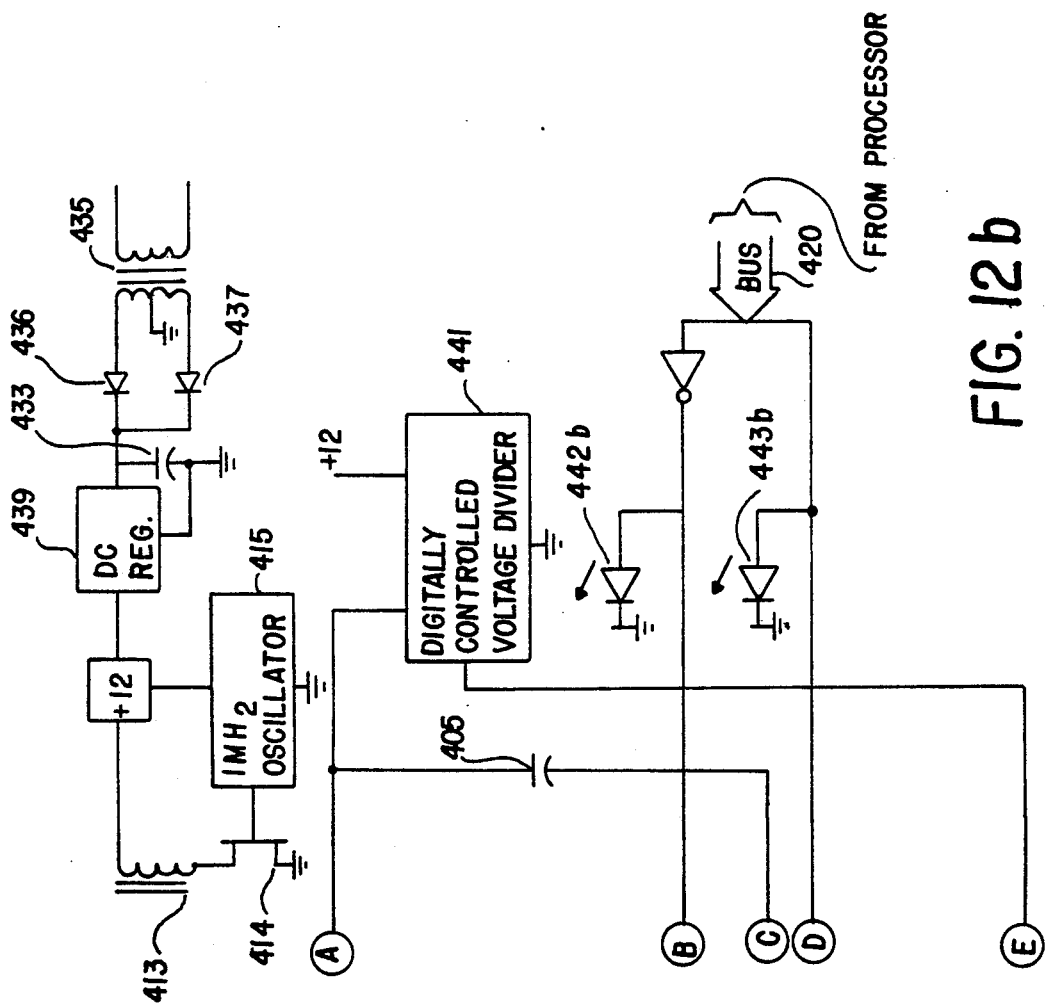

FIGS. 12a–12b illustrate a digital/analog control system in which current from the source 91 is passed through the control gate 92 and the polarity switching circuit 93 while portions of the output voltage are proportionally fed back by feedback circuit 95 to the control circuit 94. The feedback compensation is varied by means of circuit 97 based upon information from the process control computer 61 to provide feedback compensation for the regulated output current or voltage. Each of the feedback elements 95, 96, and 97 are all operated under the control of the process control computer 61 based upon preprogrammed or calculated parameters to optimize the operating conditions and control over the current flowing thru the windings of the motor, or for a piezo motor, the voltage applied to the motor.

All of the implementations of a programmable four quadrant regulator previously described use analog comparison techniques. By converting the currents sense signal into binary format, it is also possible to use digital feedback techniques to create a programmable four quadrant regulator.

MOTOR CONTROL CIRCUITS

In FIG. 12 there is illustrated a current mode control motor drive circuit for the FIG. 4 embodiment of the system of the present invention as implemented with a buck regulator, high speed MOSFET switching transistors and variable feedback compensation. The current regulator includes a DC voltage source 401 connected through the primary of a current sense transformer 402 into a regulator switch 403 comprising a MOSFET transistor. The source 401 is series connected to a small filter inductor 404 and is connected in parallel with a filter capacitor 405. The line inductor 404 and the capacitor 405 are also connected to a bridge circuit comprised of MOSFETS 406, 407, 408 and 409 and then to ground. Selected diagonal pairs of MOSFETS 406-409 are simultaneously turned on in accordance with the state of a signal from the processor control computer. Depending upon which pair of MOSFETS is turned on, the direction of current through the motor 31 is thereby determined by the process control computer. A conventional delay circuit (not shown) may be incorporated such that all four transistors of the bridge are never turned on simultaneously.

Regulating MOSFET transistor 403 is turned on and off by signals generated by a control circuit which may comprise an integrated pulse width modulator 411 which may be, for example, a Model UC-3842 PWM IC manufactured by Unitrode Corporation. A voltage referenced to the drain of MOSFET 403 is generated by a transformer secondary 412 the primary side of which, 413, is connected to a +12 volt source and driven by another MOSFET transistor 414 and a 1 MHz oscillator 415. The current passing through the secondary winding 412 is rectified by a diode 416 and filtered by a capacitor 417. An opto-coupler 418a, such as a 4050 driver, which then turns MOSFET transistor 403 on and off in accordance with the signal from the pulse width modulator 411. The operation of the pulse width modulator 411 is such as to provide current mode control in accordance with a typical buck regulator application of power MOSFETS. The detailed operation of such circuits is well known to those skilled in the art.

The output voltage from the pulse width modulator control chip 411 is connected to the photo-diode portion 418b of the opto-coupler 418a. The high side of the opto-coupler 418a is connected through an amplifier 419 to the gate of pass transistor 403 to turn it on and off. The outputs from the digitally controlled voltage dividers 421 and 441 are connected to the inputs of the pulse width modulator chip 411. This device, may comprise, for example, a Model PM-7524 8-Bit Buffered Multiplying D/A Converter manufactured by Precision Monolithics, Inc.. This device is configured such that it operates as a voltage divider with a digitally controlled division ratio, using techniques well known to those skilled in the art.

Generally speaking, this device controls the proportional division of an input voltage in accordance with a received digital signal to produce a fractional value of the input voltage as its output. The value of the input voltage to the digitally controlled voltage divided 421 is proportionally divided in accordance with a signal received on the bus 420 from the process control computer. This proportionally divided voltage is output to the pulse width modulator control chip 411, which controls the on-off ratio of the MOSFET transistor 403.

Current sense signals are developed by the transformer 402. The current from source 401 through the transformer 402 is stepped down in direct relationship to the turns ratio of that transformer, for example, 100 to 1. A diode 422 rectifies this current, and a capacitor 423 and a ferrite bead 424 form a filter network to reduce the capacitive spike caused by the initial turn-on of MOSFET 403. The resistor 425 converts the rectified current into a voltage which is directly proportional to the current flowing through the transformer 402. The value of this voltage is ratio-metrically controlled by the digitally controlled voltage divider 421 in accordance with the digital signals from the process control computer via bus 420. Depending upon the division ratio set by the digitally controlled voltage divider 421, the output of the PWM control chip 411 is varied through the opto-coupler 418a-b to control the peak current flowing through the MOSFET 403. Thus, the peak current is controlled by the process control computer. The peak current sets the ratio of the time-on to the time-off of MOSFET 403, and thus the RMS value of the current through the motor or voltage applied to the motor 31. Therefore the motor current or voltage, dependant upon which limit is reached first, is controlled by the microprocessor. As the voltage and/or current feedback loops are varied by the microprocessor, and, depending upon whether the motor 31 is serving as a motor or as a generator, the compensation needed for maximum transient response varies. An analog switch 431 which may include, for example, a Model 4066 Analog Switch made by Motorola, controls a series of capacitors 432a-432d which can be preferentially switched in or out of the circuit by the signal on the bus 420 which controls the state of the analog switch 431. Thus, the processor signal changes the feedback compensation to allow maximum transient response of the system with good stability margins under varied operating conditions of the motor 31.

A separate power supply generated by conventional means including a step-down AC transformer 435, rectifying diodes 436 and 437, a filter capacitor 438 and a linear regulator 439 is used to power the digitally controlled voltage dividers 421, 441 and the analog switch 431 as well as to generate drain referenced voltages for all of the MOSFET transistors where the drains are not referenced to ground, i.e. MOSFET transistors 403, 406 and 407. MOSFET transistors 406 and 407 are driven on and off by the same method described above for transistor 403 under control of their respective opto-coupler control circuits 442 and 443.

Diodes 451-454 allow current flow around the steering MOSFET transistor 406, 407, 408 and 409 such that if the transistors are not simultaneously switched on or off, the inductive energy in the motor coil cannot form dangerously high voltage spikes which could destroy the MOSFET transistors.

Diode 461 allows current to flow through the inductor 404 when MOSFET regulator transistor 403 is off. During this period inductor 404 sources current. When regulator transistor 403 is on, current flows from the voltage source 401 storing energy in inductor 404 as well as providing energy to the motor 31. The ratio of time when the inductor 404 sources current to the time when the inductor 404 stores power determines the total amount of current, averaged over time, flowing through, or voltage applied to the motor 31.

Alternative implementations are also possible utilizing other current/voltage control devices such as linear regulators or different types of switchmode regulators. The switchmode regulators might be selectively, a buck regulator, a flyback regulator, a half bridge regulator, a full bridge regulator, a boost regulator or combinations thereof.

It should also be noted that other types of regulation schemes could be used to generate a digitally controlled current/voltage regulator for driving a motor in accordance with the teachings of the present invention. For example, in the above referenced Application Note U-101 of Unitrode Corporation, pages 234-242 and entitled "200 KHZ Current-Mode Converter Provides 500 W" there is shown a centered-tap push-pull topology operating with a continuous inductor current regulating scheme uses an artificially generated ramp instead of the current flow through the motor. The steering transistors themselves are ratio-metrically controlled directly, and no external chopping transistor such as MOSFET 403 of FIG. 11 is used.

In addition, there is also available a chip from the S.G.S. Corporation which controls the voltage or current in response to bi-directional analog signals through a motor. This chip is a two quadrant controller with current limit, rather than current regulation. The digital signals from the process control computer must first be converted into analog signals by a digital to analog converter in order to implement this chip for the system of the present invention.

CALIBRATION CALCULATIONS

While the principal function of the system of the present invention is to provide to the operator selected force feedback, the system also inherently allows the measurements of motor torque/force and system/load or mass. The motor/encoder assemblies of the system are preferably disconnected from their control/load combinations and calibrated individually. The accuracy with which the system of the present invention can measure selected forces acting on the motor shaft to provide tactile force feedback is dependent upon the calibration of the system prior to operation. In particular, the system is run through a standard calibration routine in which a number of parameters are evaluated and used to build look-up tables within the memory of the microprocessor and/or host computer to enable the evaluation of system forces, load forces, motor developed forces, system and/or gripped masses, or distance traveled using velocity and/or accelerations developed while operating the actuator.

In general, the technique used for calibration is that the system is first run through a setting of a plurality of selected values of current through the winding of the motor or for piezo motor, the voltage applied to the motor, with no external load on the shaft. For each of the different values of set current for the electromagnetic motor, or for the piezo motor set voltage, successive values of shaft angular displacement as a function of time are measured and used to calculate velocity and acceleration. Thereafter, these data comprising a plurality of associated values of current and acceleration of the motor shaft with no external load are stored in the table. Next, a mass of known value is affixed to the operating shaft of the motor and the process of successively setting a plurality of selected current values while measuring the periodic displacement of the operating shaft as a function of time is effected so that corresponding values of velocity and acceleration may be measured and calculated with a known load. Thereafter, the system stores a plurality of associated values of current and acceleration of the shaft when loaded by the known mass.

Next, successive values of shaft acceleration with no load are subtracted from the corresponding successive values of shaft acceleration with the known load. Both sets of successively values were previously stored and the difference value is now stored. For each value of acceleration difference calculated, the net force produced on the shaft of the motor is calculated for each preselected value of current. The system then stores in a look-up table each of the net force values in association with a corresponding binary number which establishes a set current or voltage regulator value.

With the motor shaft next connected to the system, the mass of the system connected to the motor shaft is determined by setting a known level of force output by the motor and measuring the acceleration of the motor shaft. With both the force and acceleration known, Newton's law ($F=Ma$) allows complete determination of the system mass.

With these data stored, a dynamic force measurement can be made of a shaft under load by fixing successive currents through the winding of the motor for an electromagnetic motor or applying set voltages to the motor for the piezo motor and measuring the acceleration of the shaft for the current or voltage set. Thus, with known accelerations, known forces (set currents or voltages), and known masses, it is clear that:

$$F_{total} = F_{set\ force} + F_{unknown} = MA.$$

Thus:

$$F_{unknown} = F_{total} - F_{set}.$$

As can be seen using the above described calibration procedure, the exact value of force output by each motor for a given binary number can be precisely determined. This allows the control computer to accurately set a precise force level output by the control motor and the load motor by manipulation of the binary numbers output to each motor. It also allows storage of the exact value of force and distance input by the operator to the control motor and the exact value of force and distance output to the load by the load motor. It further allows measurement and storage of forces imparted to the load motor drive shaft by the forces developed by, and externally acting upon, the load. It further allows measurement and storage of the load reaction forces developed as a consequence of movement of the control motor shaft by the operator.

Figure 13A:
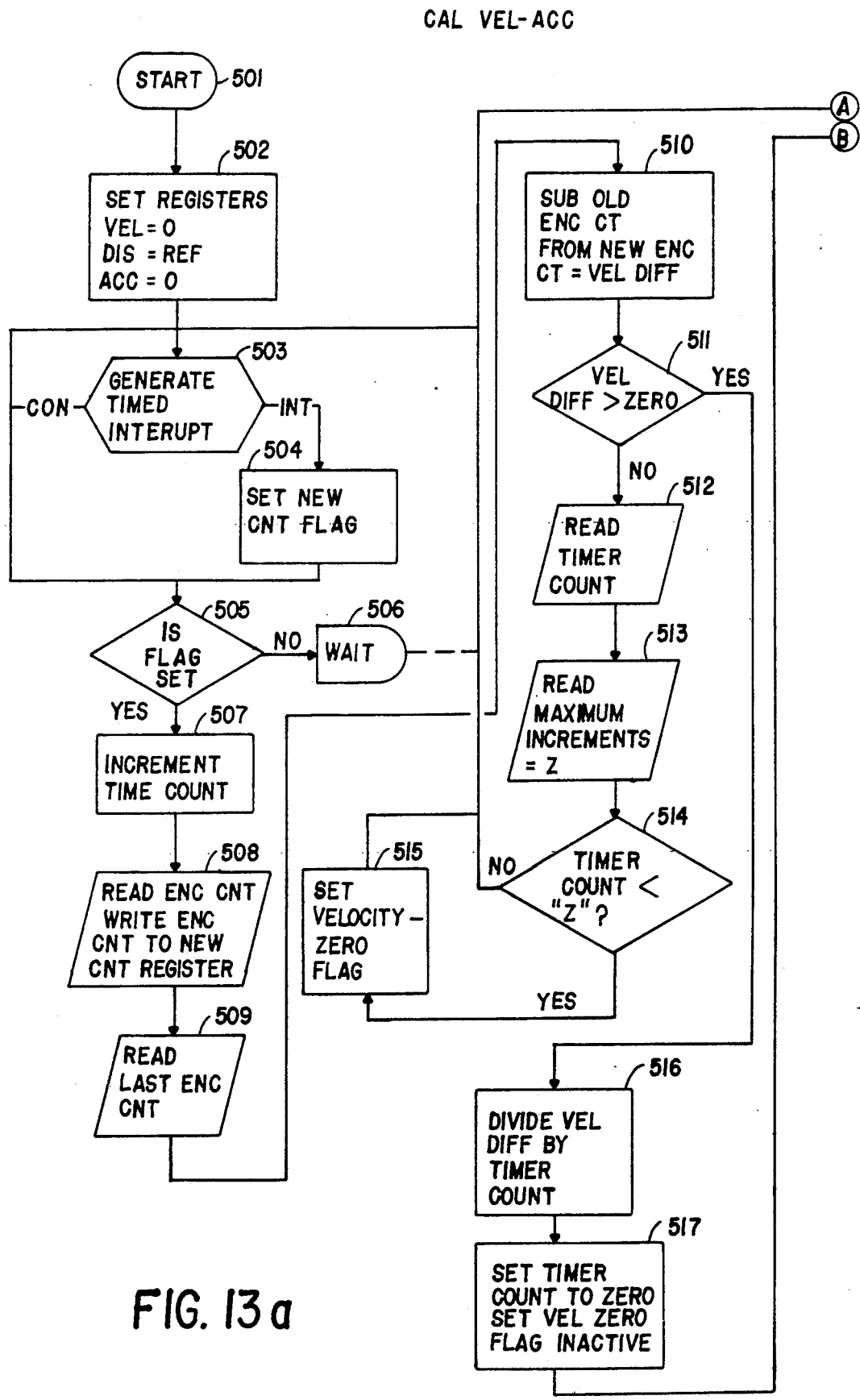
FIGS. 13a–13b constitute flow chart illustrating the manner in which velocity and acceleration for each of the motors in the system of the present invention are calculated.

There is shown in FIGS. 13a-13b a flowchart illustrating the manner in which the programming of the system of the present invention calculates velocity and acceleration values so as to be able to calculate selected forces while calibrating or operating the system.

The subroutine starts at 501. At 502, the system initializes its internal registers including setting velocity and acceleration equal to zero. It is also possible to set displacement equal to some reference value which might include zero. At 503, a timed interrupt is generated creating a precise time interval in which to perform the various reading operation. In particular, this timed interrupt is set such that it is somewhat longer than the worst case time necessary to finish the subroutine. Depending on the expected average velocity envisioned, this period might be set to a somewhat longer time interval than the minimum such that generally only one interrupt occurs per encoder count increment. The timed interrupt has first priority over all other processor activities and so sets a definite time period in which the encoder counter is read, regardless of what else the processor is doing. At 505, the system asks whether or not the new count flag is set, and if not, the system waits at 506, until the timed interrupt halts the wait state. At 504, a new count flag is set immediately after the timed interrupt occurs. Once the new count flag check is positive at 505, the system increments the time increment counter which determines how many time intervals have occurred since the shaft encoder has changed encoder counts. The subroutine then continues on to read the position encoder counter and also writes the count contained within the position encoder counter into a position encoder registers at 508. At 509, the previous value of the position encoder register is read and at 510, the new and previous values are subtracted and given the value VEL DIFF. At 511, a check is made to determine the encoder count difference is zero. That is, whether or not the shaft has moved at least one encoder count during the time interval as set by the timed interrupt. If the result is no, the subroutine continues on to 513, where the value "Z" is read from memory. The value "Z" is the maximum number of time increments allowed to elapse without an encoder count difference while considering the velocity value to be greater than zero. After this value is exerted, the velocity value is considered to be zero. At 514, a query checks that "Z" is less than the timer increment count. If the query yields a no, the subroutine loops back to 503 to wait until another timed interrupt occurs. If the query yields a yes, the subroutine continues on to 515, where the "velocity equals zero flag is set. The subroutine then loops back to 503, and continues on as previously described. If the query at 511 yields a yes, the subroutine branches to 516, where the encoder displacement value change is divided by the number of time intervals elapsed. The result, which is distance divided by a known change in time yields the velocity of the shaft. At 517, the time increment counter is set to zero and the zero velocity flag is also set low or inactive. Next at 518, a velocity checking subroutine is called which ensures that the calculated velocity is believable. At 519, the velocity check subroutine output is polled to see if the velocity value is believable or physically realizable. If the answer is yes, the subroutine continues on to 520, where the new value of velocity, just calculated from the difference between encoder displacement change per unit of time elapsed is written into the velocity register. If however, the answer is no, the subroutine returns to 503, to check the velocity again. A watchdog counter (not shown) might terminate this loop and set an error flag if the number of loops without getting a velocity believable value exceed a preset number of loops. After the velocity has been written into the new velocity register 520, the subroutine continues on 521, where the values of the new-old encoder counts are swapped. Also at 521, the old encoder counter value is written into main storage memory. At 522, the decision is made as to whether or not to calculate acceleration. If the answer is no, the subroutine jumps to 530 then ends. If the answer is yes, the subroutine continues on to 523, where the new velocity value is read into the processor stack. The subroutine continues on to 524, where the old velocity value is also read into the processor stack. At 525, the old velocity value is subtracted from the new velocity value to yield a tentative value of acceleration. At 526, a sub-subroutine is called which checks to see if the just calculated acceleration is believable or physically realizable. Next at 527, the subroutine checks the results obtained from 526. If the query yields a yes, a new value of acceleration is written into the stacks at 528. If not, the system returns to 503 and continues to calculate a new value of velocity. The subroutine continues to loop until a positive answer at 524 is yielded or until halted by some other process such as a watchdog counter (not shown). At 529, the old and new acceleration values are swapped and the old value recorded in permanent memory. The subroutine then ends at 530.

As can be seen, this flow chart describes the acceleration and velocity calculating subroutines needed for motor/regulator output force calibration and selected force measurement.

Figure 14:
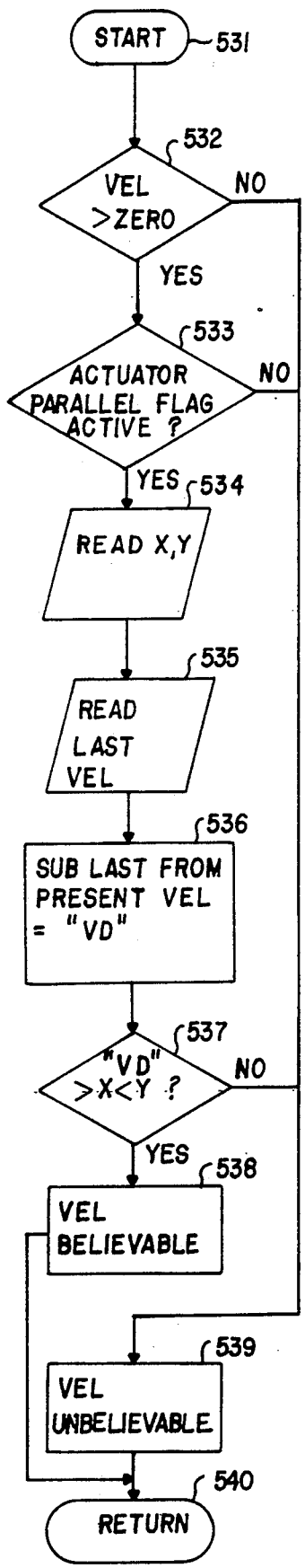
FIG. 14 is a flowchart illustrating a subroutine which checks the believability of the calculated velocity values before storage in memory.

FIG. 14 describes a subroutine which checks whether or not the velocity value as calculated is believable before storing the value in memory. The subroutine begins at 531 and continues on to 532, where a query checks whether the velocity is zero. The velocity calculating subroutine should not let a zero value continue to this point; so a zero value must be incorrect. If the 532 query returns a no, the subroutine branches to 539. If the query result is yes, the subroutine continues on to 533, where another query checks whether or not the actuator parallel flag is active. If this flag is inactive the piezo actuator plates are either not parallel or the parallel servo is active. Both conditions might cause a velocity error so the query branches to 539 when this flag is not active. This query is only needed for the piezo actuators and normally is skipped for electro-magnetic motors. If the query result is yes, the subroutine continues on to 534, where the variables "X" and "Y" are read from memory. "X" is the maximum difference from the previous velocity value read, while "Y" is minimum velocity difference from the last velocity value. These parameters will usually be a constant, but could also be functions of the average velocity value, shaft torque or shaft position. In some cases the mode of operation such as calibrating or operating might be used as additional arguments to set these values. At 535, the last velocity is read from the processor stack and at 536 the last velocity value is subtracted from the present velocity value to yield the velocity difference "VD". Next at 537, a query checks whether or not the velocity difference "VD" is within the envelope as set by the "X", "Y" values. If no, the subroutine branches to 539. If yes, the subroutine continues on to 538, where believable outcome value is set. The subroutine then continues on to 540. If the subroutine ranches to 539, an unbelievable outcome value is set, then the subroutine also continues on to 540, where control is returned to the calling subroutine or program.

Figure 15:
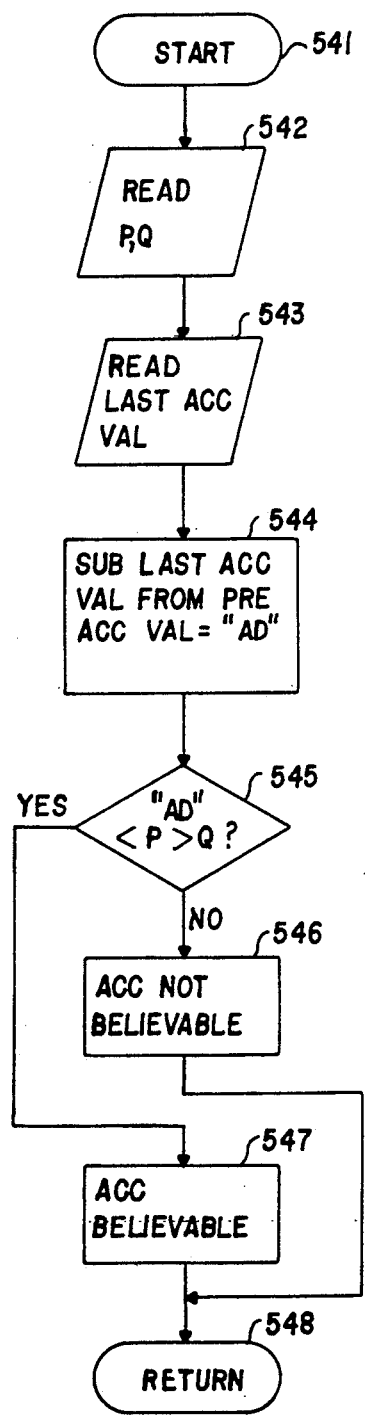
FIG. 15 is a flowchart illustrating a subroutine which checks the believability of the acceleration values before storage in memory.

FIG. 15 is a subroutine which checks the believability of the acceleration value before storage in memory. The subroutine starts at 541 and continues on to 542, where the values "P" and "Q" are read from memory. These values usually are constants derived from the mechanics of the system. They could also be variables which might be functions of the velocity, position or operating mode. At 543, the last value of acceleration is read from memory. Next at 544, the last acceleration value is subtracted form the present acceleration value to yield the difference value "AD". At 545, a query checks whether or not the value "AD" is within the envelope set by "P,Q". That is, whether or not "AD" is less than "P" but greater than "Q". If yes, the subroutine branches to 546, where the believable outcome is set. If no, the subroutine continues on to 547, where a not believable outcome is set. At 548, the subroutine returns control to the calling subroutine or program.

Figure 16:
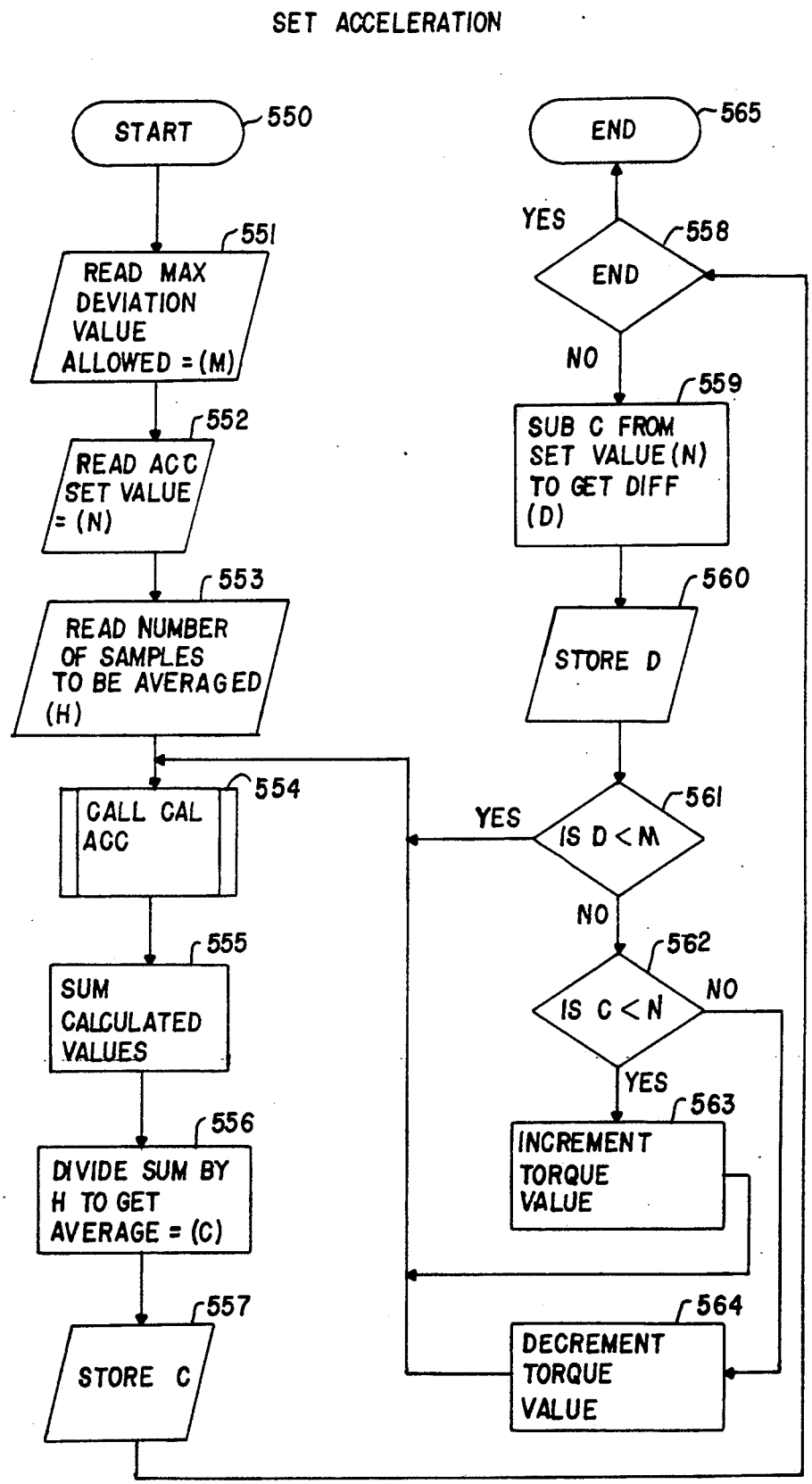
FIG. 16 is a flow chart illustrating the manner in which the velocity in the system of the present invention is set.

FIG. 16 describes the set acceleration/velocity subroutine called in the previously described calibration procedures. The subroutine begins at 550. At 551, the subroutine reads from memory a preselected value (M). This value is the maximum permissible deviation of either acceleration or velocity being set by the subroutine. Only accelerations will be discussed below, however, the steps apply equally to setting velocity as should be clear from the flow chart itself.

Sometimes, it is desirable to average the value of acceleration over a number of counts. The value (H) is the number of counts to be averaged. If no averaging techniques are needed, (H)=1. Next the program calls the subroutine which determines acceleration as described previously.

Figure 13:
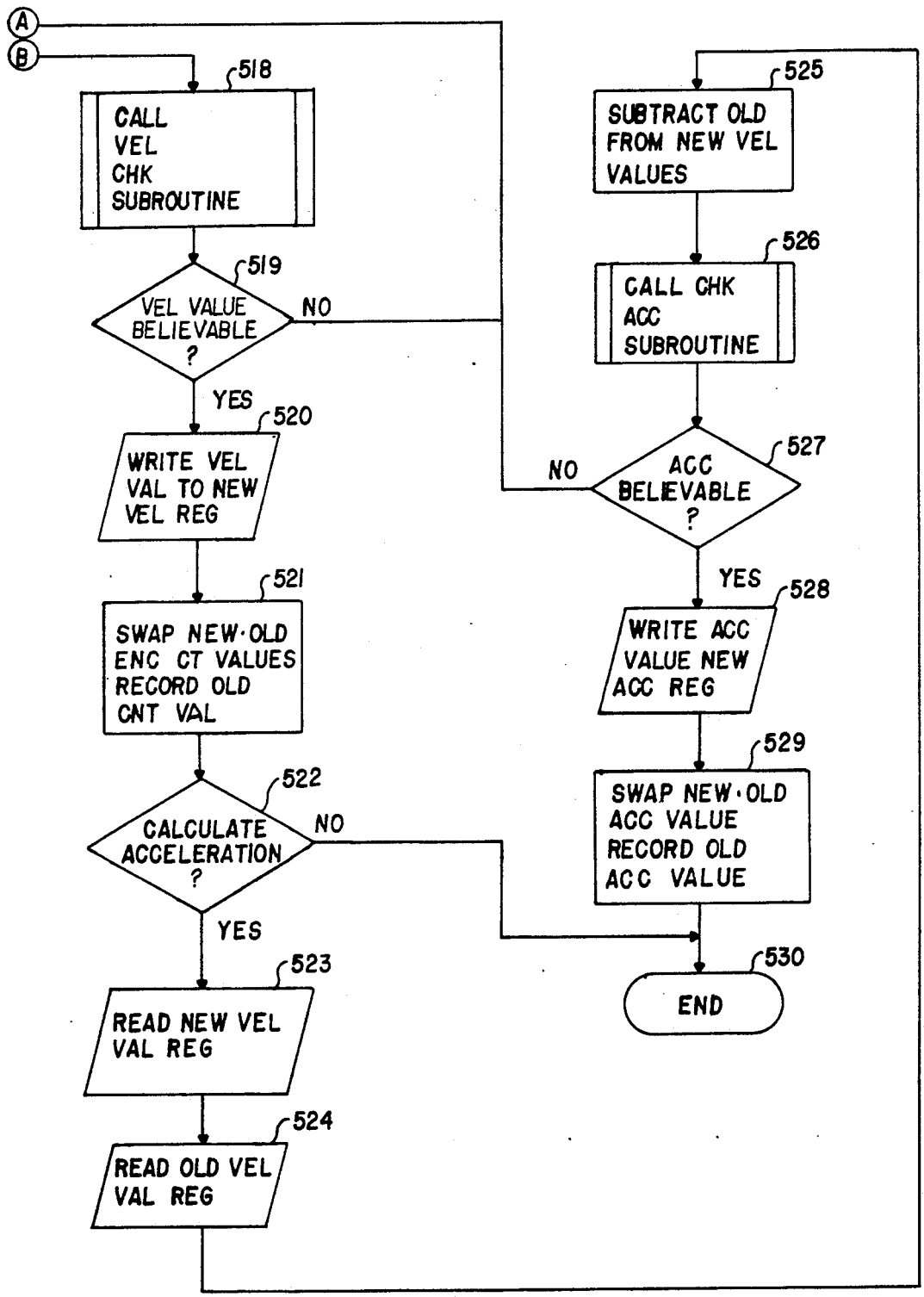

Reading in the previously described value of (M) from memory occurs at 551. Continuing on to 552, the subroutine reads in the set value of acceleration or velocity which is labeled (N). Next at 553, the previously described value (H) is read from memory. At 554, the subroutine calls in the aforementioned calculate velocity/acceleration subroutine of FIG. 13 to determine acceleration or velocity values. Normally for calibration, the motor shaft will be positioned to rotate perpendicular to the gravitational force, such that gravitational forces are canceled in the plane of the shaft rotation. The subroutine is then iterated (H) times to obtain (H) number of velocities or accelerations. These values are summed at 555, and divided by (H) at 556 to obtain (C), the averaged value of acceleration. (C) is stored in memory at 557. At 558, the subroutine checks to see if a exit signal is active. This query is positioned such that the program may serve only to average acceleration values and not adjust torques. This also allows repetitive looping to maintain a set acceleration for lengthy intervals. If the query produces a yes, the subroutine ends at 565. If no, the program then subtracts (C) from the wanted acceleration value, (N) at 559, and stores the difference between (N) and (C) as the value (D) at 560. At 561, the program checks to see if the value is less than the allotted difference (M). If this is true, the program loops back to 554 and obtains another averaged value of acceleration, (C). If false, the subroutine then checks to see if (C) is less than (M) at 562. If (C) is less than (M) at 562, the subroutine increments the motor torque valve at 563 and loops back to 554 to obtain a new value of (C). If not, the program decrements the torque value at 564, and then loops back to obtain a new value of (C) at 554.

The set velocity subroutine is virtually identical to the set acceleration subroutine specifically illustrated in FIG. 16, except that only velocity is calculated instead of continuing on to calculate the acceleration value.

Figure 17:
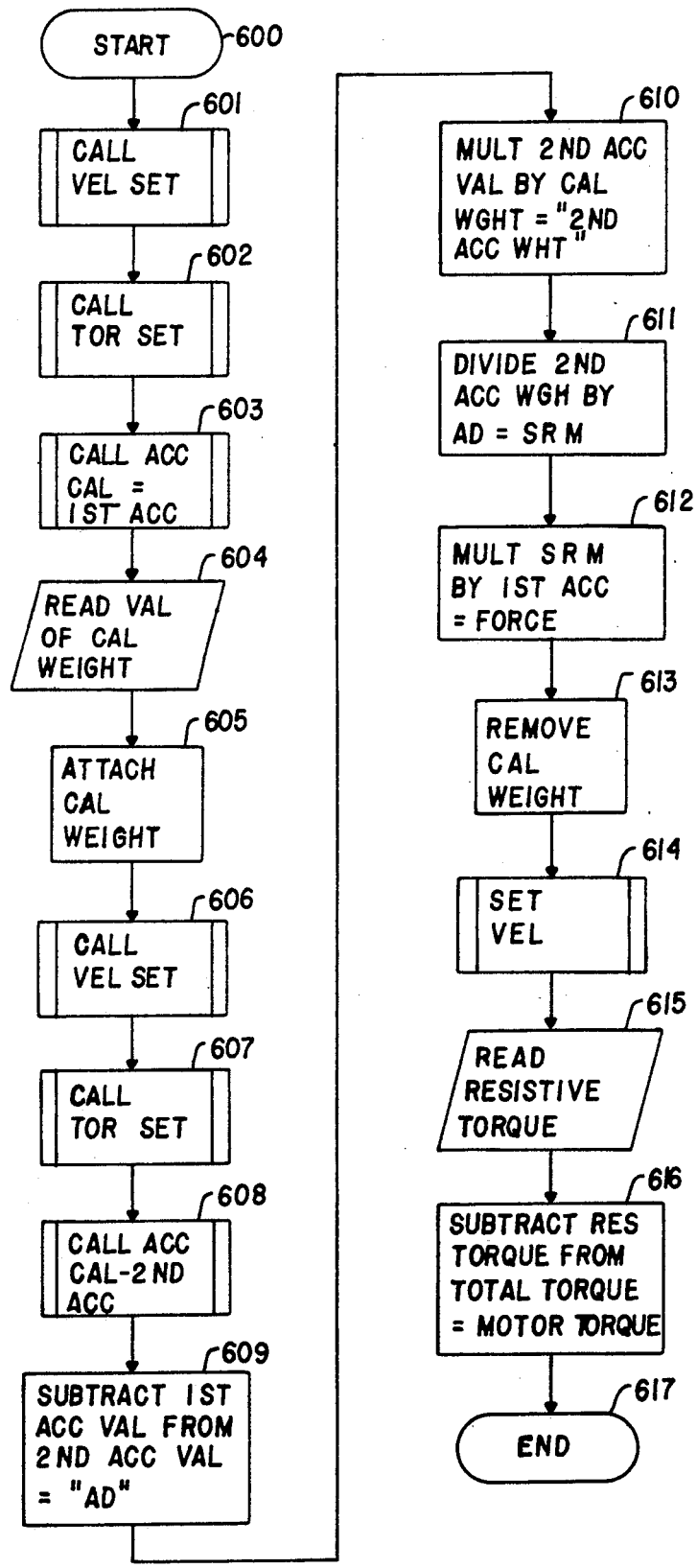
FIG. 17 is a flowchart describing the procedure used for initial motor calibration.

FIG. 17 is a flow chart that illustrates the calibration procedure discussed earlier. The produce starts at 600, and continues on to 601, where the previously described velocity set subroutine is called. This ensures that moving friction rather than static friction opposes movement of the shaft and also allows differing acceleration polarities to be used. At 602, a set torque value is applied by the motor to the shaft. Continuing on to 603, the acceleration of the shaft with the set torque value is calculated using the cal acceleration subroutine described earlier. This value is stored in memory as "1st acc". Next, the value of a calibrated mass or moment depending upon whether torque or force measurements are needed, is read into memory at 604. At 605, the program halts and generates a prompt or flag for either the operator or some automatic placement system to attach a calibrated weight to the motor shaft or output. Once this task is accomplished, the procedure continues on to 606. The previously described set velocity subroutine is then again called, and using this subroutine, the motor shaft is set to the same velocity as used at 602. Next at 607, the same torque value as used at 603 is set to the motor. At 608, the cal acceleration subroutine also described earlier, calculates the value of acceleration with the calibrated weight affixed to the shaft. Continuing on to 609, the first value of acceleration is subtracted from the second acceleration value to yield the value of acceleration difference labeled "ad". At 610, the second value of acceleration is multiplied by the value of the calibrated weight to yield the value labeled "2nd acc wht". The 611 block divides the "2nd acc wht" value by "ad" or acceleration difference to yield the value of the mass or moment of the motor shaft and rotor labeled "SRM". Next at 612, the "SRM" or shaft rotor mass obtained at 611, is multiplied by the first value of acceleration to yield the value of force set to the motor at 612 and 608. The procedure is halted at 613, where a prompt or flag is set instructing an operation or automatic process to remove the calibrated weight. Once this task is accomplished, the procedure continues on to 614, where a velocity value, which is the average of the velocity range over which the acceleration was evaluated, is set. For the velocity to be constant, the acceleration must be zero and thus the torque needed to maintain the set velocity must equal the opposing torque which is the bearing resistance of the motor. At 615, this resistive torque value, which is the torque needed to maintain the set velocity, is determined. The total system forces as calculated previously in the procedure are the sum of the motor torque and the resistive torques. The resistive torque is subtracted from total torque at 616, yielding the value of torque or force output by the motor. At 617, the initial calibration procedure ends.

Figure 18A:
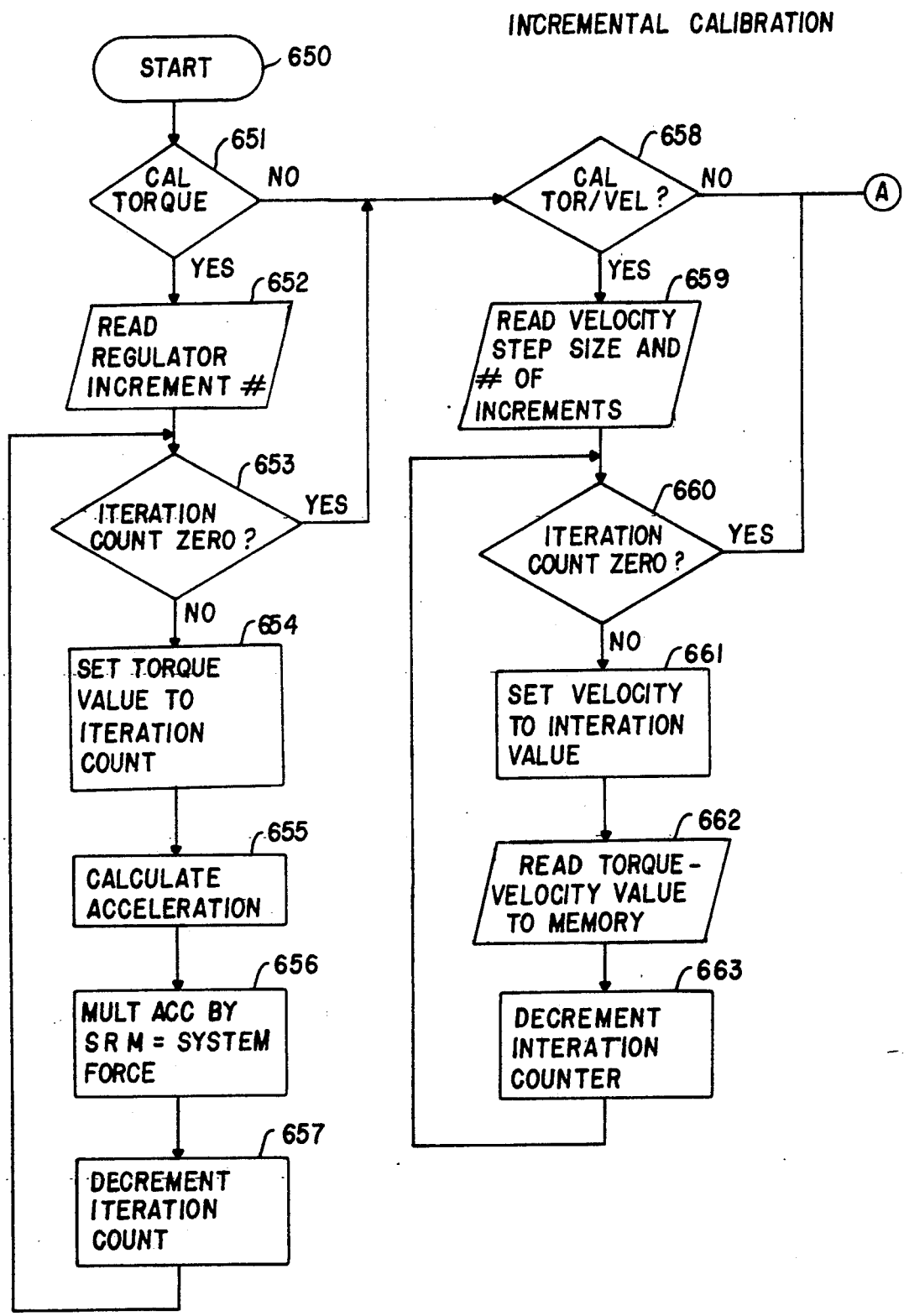

FIGS. 18a-18b illustrate a continuation of the calibration procedure wherein the procedure calibrates the regulator/motor system for each program step of the regulator and also for velocity and or position dependant friction variations. Once the shaft rotor mass or moment has been determined as described previously in FIG. 17, the procedure then calculates the torque values for all motor/regulator values and also determines the friction at various selected velocity values. The procedure starts at 650, and continues on to 651, where a query checks as to whether or not motor torque/force is to be calibrated. If the query result is negative, the procedure branches to 658. Otherwise, the procedure continues on to 652, where the regulator increment is set. The Regulator increment number will usually be determined by the number of bits used in the feedback resistor arrays. For example, if 8 bits are used, the increment number will be plus or minus 128 increments or 256 total increments. More specifically, the increment number is 2 raised to the power of the number of feedback bits. Next at 653, A query checks that the iteration count is zero. If zero, the procedure branches to 658. If not zero, the procedure continues on to 654, where the motor torque is set the value of the iteration counter. Next at 655, the acceleration resulting from the torque output for that increment number is calculated as described previously. Continuing on to 656, the acceleration value obtained at 655 is multiplied by the shaft rotor mass obtained using the previously described procedure of FIG. 17, to yield the system torque for that value of motor torque increment and shaft velocity. The iteration counter is decremented at 657 and loops back to 653, where the procedure continues to loop until the iteration count is zero. When the iteration count reaches zero, the procedure branches to 658. At 658, a query checks whether or not the resistive torque-velocity calibration is wanted. If the query returns a no, the procedure branches to 664, then continues on. If the query yields a yes, the procedure continues on to 659 where the velocity step size, that is the velocity change wanted for each increment and also the number of increments is read. At 660, the iteration counter is checked to see if the iteration count is zero. If so, the procedure branches to 670. If the iteration count is not zero, the procedure continues on to 661, where the velocity is set to a value as determined by the increment count. Continuing on to 662, the torque needed to maintain this velocity and the set velocity is read to memory. At 663, the iteration count is decremented and the procedure loops back to 660. The procedure continues to loop until the iteration count is zero, then branches to 664. At 664, where a query asks whether or not the resistive torque is to be checked for changes as a function of position or angle. At very low velocities bearing imperfections might cause the resistive torque to vary as a function of angle and this correction allows these differences to be determined. If the query returns a no the procedure branches to 670. If however, the query returns a yes, the procedure continues on to 665, where the distance/angle step size and the number of step increments are read. Next at 666, a query checks to see if the increment counter is zero. If the query yields a yes, the procedure branches at 670. If however, the query yields a no, the procedure continues on to 667, where the velocity value at which the torque is measured, is set. Although one velocity is shown, multiple velocities could be used in an iterative fashion as described earlier. At 668, the torque needed to maintain the set velocity for the distance/angle of that increment is determined and read into memory. Continuing on to 669, the iteration counter is decremented. The procedure then loops back to 666 and continues in this loop until the iteration count is zero. At 670, a query asks whether or not the resistive torque is to be averaged over a range of velocities. The acceleration value used to obtain total forces is evaluated over a range of velocities and the resistive torque may vary somewhat over this range. Sometimes it is useful to determine the average resistive torque over the velocity range. If the resistive torque average is not needed, that is, the query yields a no, the procedure branches to 673. If however, the query yields a yes, the procedure continues on to 671, where the velocity-resistive torque values to be averaged are read. At 672, these values are averaged using techniques described previously in the set acc subroutine description. If the procedure branches to 673, a query checks to see if the motor torque is to be calculated from system torque. If the query yields a no, the procedure branches to 675, If however, the query result is a yes, the procedure continues on to 674, where the averaged value of resistive torque is subtracted from system torque to yield the value to motor torque. If the procedure branches to 675, a query checks to see whether or not the system torque is to be calibrated for velocity dependant resistive torque changes to yield a corrected value of motor torque. If the query yields a no, the procedure branches to 597. If yes, the procedure continues on to 676, where the measured resistive torque value is compared with the average resistive torque value and the motor torque is corrected for any difference between the two values. At 677, a query checks as to whether or not to correct for position dependant errors. If the query yields no, the procedure branches to 679. If however, the query result is yes, the procedure continues on to 678. Here the average resistive is compared to the measured torque value of the position step in use and corrected for any difference between the two values. At 679, the calibration procedure ends. As can be seen, the calibration procedure together with the subroutines called by the procedure provides for complete calibration of the motors and regulators used in the system. In some instances, such as replacement of parts, only the motor or regulator, but not both might need to be recalibrated. The procedure allows selection of parameters checked to provide partial calibration in cases where complete calibration is not necessary.

After the motors are calibrated, an operational program to control the forces applied to both motors in real time is described.

Figure 19A:
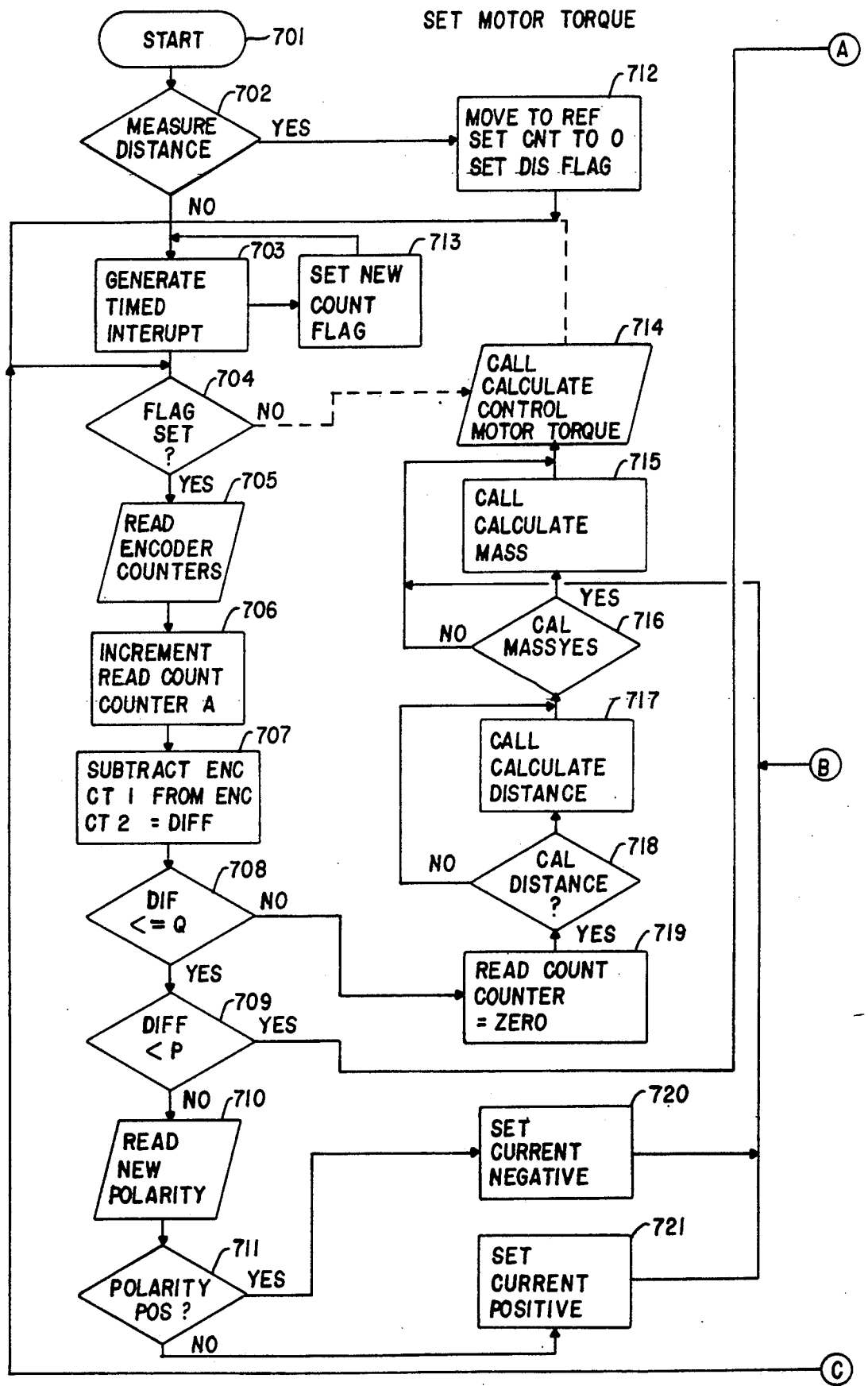
FIGS. 19a–19b constitute a flowchart illustrating the setting of the load motor torque such that the load motor tracks the control motor.
Figure 19B:
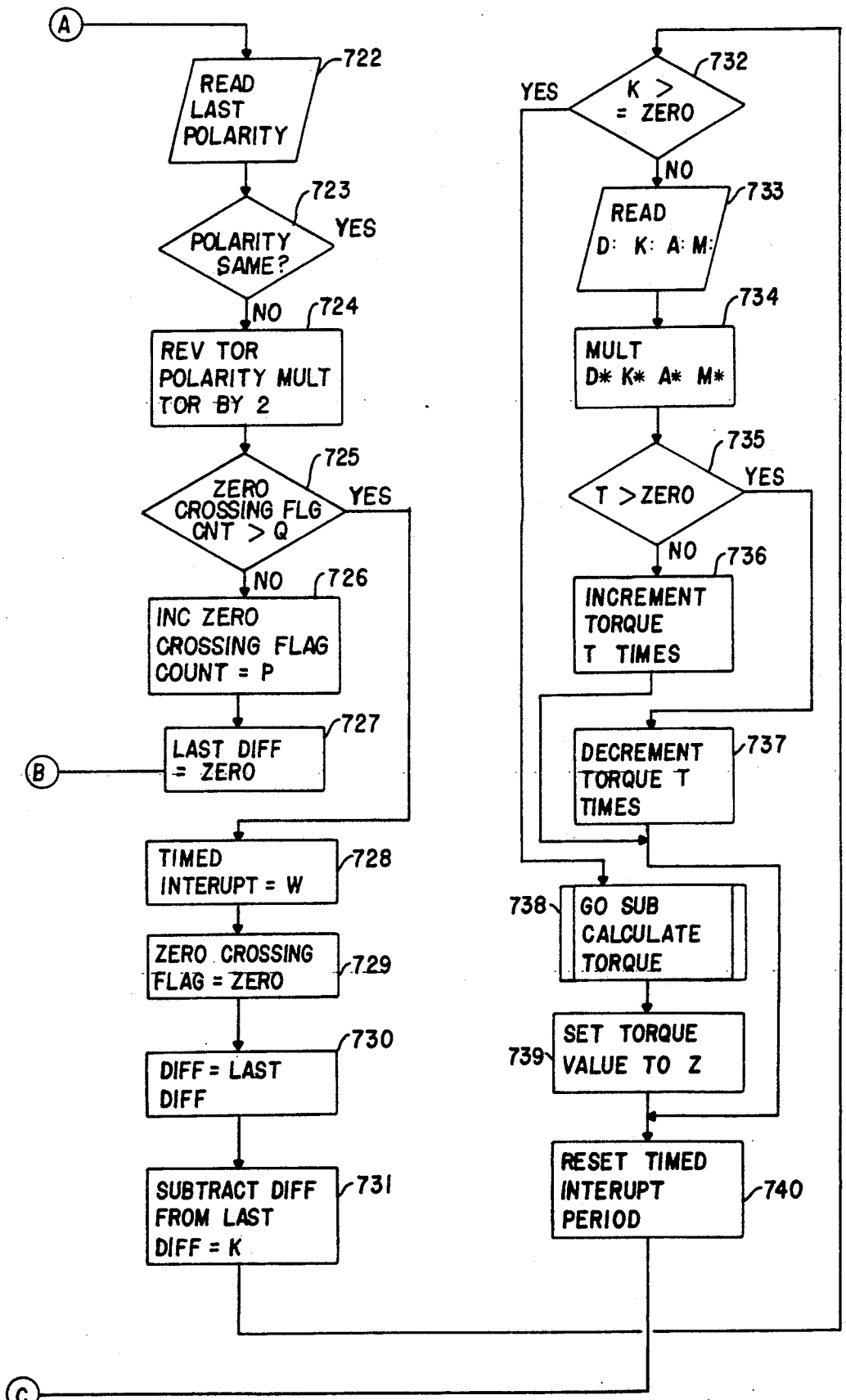

FIGS. 19a-19b constitute a flow chart which outlines the operating program for setting load motor torque such that the load motor shaft position tracks the control shaft motor. The program starts at 701, and asks whether or not to measure distance at 702. This query occurs only at start up and is not part of the main operating loop. If the query returns a yes at 711, the motors are commanded to move to a known position reference. When this reference point is reached, the encoder counters are set to zero. If the answer is no, the system continues on to start the main operating loop at 703, where the system generates a timed interrupt. This is a first priority interrupt, which takes precedence over any other activity the processor might be doing. The time period between interrupts is set longer than the worst case time needed to complete setting the torque of the load motor. This interval is somewhat shorter than the time needed to set the feedback torque of the control motor. This means one time increment is needed to set load motor torque, but more than one increment is needed to set control motor torque. This time period might also be adjusted dependent upon the mechanical characteristics of the system, or in some cases changed by the program itself. For the super Z8 with a 20 mhz clock, this time period is on the order of 250 microseconds. With a digital signal processor such as the AT&T 24000 with a 33 Mhz clock, the time period might be on the order of 50 microseconds. At the occurrence of an interrupt, the program continues on to 713, where the new count flag is set. Otherwise the program goes to 704 and queries as to whether the new count flag is set. If the query returns a no, the program continues on to 714, where the calculate control motor torque subroutine is called. The program timing is such that this subroutine will be interrupted before completion. The read flag will be set by the interrupt causing the program to branch to 705 at the occurrence of the interrupt, where the motor encoders are read. This allows a well defined time interval to be established for reading the motor encoders.

After this is accomplished, the program continues on to 706, where a counter, which stores the number of read increments as the value "A" is incremented. The program then continues on to 707, where the load motor encoder count designated "ct. one" is subtracted from the control motor encoder count designated "ct. two", and the algebraic difference is stored as the value "Diff". For the purposes of description the encoder resolutions are then considered to be equal. If the encoder resolutions are not the same, one of the counts might be multiplied by a scaling factor, such that the same distance or angular distance is the same for both encoders. In some cases, the physical dimensions of the control and manipulator might differ. In this configuration, the encoder resolutions might be set so as to reflect the differences in dimensions.

The program then continues on to check at 708 if the algebraic value of "Diff" is less than "Q", where "Q" is a variable stored in memory and read to the processor stack when needed. The value of "Q" is the maximum tolerance from zero allowed which is still considered zero. Thus "Q" sets basic accuracy of the tracking of the two motor shaft positions. Normally "Q" is a constant but might be varied as a function of velocity and/or position. The value of "Q" might also be changed when an event such as making contact with an external object occurs. If "Diff" is less than "Q" at 708, the load motor shaft is considered to be in the correct position, as commanded by either the control motor or by programmed control instructions, thus no torque changes for this time period are necessary. So the program branches to 719, where the program resets the read counter and continues on to 718. Here a query is made as whether or not to calculate the distance from the reference. If the query result is yes, the calculate distance subroutine is called at 717. If the result is no, the program branches to 716. Here another query asks if the gripped mass is to be calculated. If the query result at 716 is positive, the program continues on to 715, where the calculate mass subroutine is called. If the query result is negative, the program loops back to 714. Once either subroutine is completed the program also loops back to 714. If Diff is greater than "Q", the program continues on to 709, where a query checks if the encoder error is less that "P". "P" is a error value larger than "Q", but still quite small. Normally only small torque increment or decrement step changes are needed to correct the encoder error. If "Diff" is less than "P", the program continues on to 710, where the error polarity value is determined. At 712, a query checks the polarity value and if found positive sets the regulator output negative one increment at 702. If the query result is negative, the regulator output is positive one or more increment at 721. Once the regulator is set, the program loops back to 703, the start of the operating sequence. If at 709, "Diff" is greater than "P". The operating sequence branches to 722, where the last polarity value is called. At 723, a query checks to see if the polarity has changed. If the answer is no, the program branches to 728, where the zero-crossing flag is reset and continues on to 729, where the new difference is set to the last difference and continues on. If at 723, the query returns a yes, the program continues on to 725, where the load motor torque is reversed and multiplied by the fractional value "Z".

If the error polarity has changed, the encoder differences must have been driven past zero. Additionally, the error value is such that more than small torque increments are needed to converge the error to zero. This usually indicates that the set force value is considerably larger than it should be. Normally reversing and decrementing the torque value as explained earlier will be sufficient for the error to converge to zero. In some cases however, the system might be mechanically oscillating and incremental torque reductions might not allow the system to quickly stabilize. To correct for this possibility, at 725, the program checks that the number of sequential zero crossings is less than some preprogrammed limit "Q". If the query result is positive, the program branches to 728. Otherwise the program continues on to 726, where the number of zero crossings is incremented and stored as the value "I". At 727, the difference value is set to zero. This references the error to the position as set by the control motor, rather than the last position of the load motor. The program then loops back to 715 and continues on as described earlier.

The program will branch to 728 only when more than small quickly calculated torque corrections are necessary. To allow time for these more detailed calculations the time increment is increased to a new value "W" at 728. At 729, the zero crossing counter is reset to zero. The program continues on to 730 where the new difference is set to the last difference, and then on to 731 where the last difference is subtracted from the new difference to yield the value "K".

At 732, query is made as to whether the error is increasing as shown by a positive value of "K". If the query returns a no, the program continues on to 734, where the values of "Diff", "K", "A", and "M" are read from memory. The value "Diff" is the algebraic difference in load motor and control motor encoder counts. The value "K" is the algebraic difference between the present encoder count difference and the previous encoder counter difference. The value "A" is the number of interrupt time periods as determined by the read counter. The value "M" is a proportionality constant which scales the numerical values obtained from this process into a proper value of torque step increments, as output by the microprocessor. This number may be a constant, may be obtained from a look up table dependent upon one or more of the previous parameters, or might be obtained by some algebraic formula which could be linear, exponential, factorial, or hyperbolic, depending upon the dynamics of the system. The program then continues on to 734, where "Diff", "K", "A", and "M" are multiplied together to obtain the value "T". While the program shows simple multiplication, weighing factors for each of the factors might also be included. That is, certain parameters, such as the absolute difference for example, could be given additional weight by multiplying that parameter by a weighing factor to allow more or less force change as a function of particular parameter, rather than all the parameters. At 736, "T" is checked to determine if it is positive or negative. If negative, at 735, the torque is decremented "T" times, at 737 and the program branches to 740. If positive at 753, the torque is incremented "T" times at 736, then the program also branches to 740. If however, the query at 732 yields a yes, the set torque is insufficient to drive the motors to convergence. If this event occurs, the program branches to 738, where the subroutine calculate torque is called. The program then continues to 739 and sets the torque to the value yielded by the calculate torque subroutine. Next, at 740, the timed interrupt period is reset. The program then loops back to 703 to continue as described previously.

As can be seen from the above description, the flow chart outlines a routine wherein the encoders of both motors are precisely read at precisely timed intervals. If the difference between the two encoder count values is zero or close to zero, both motor torque values are left set at the last torque value and the program goes into a loop until a difference is found.

If a small error is detected, the encoder differences are checked to see if small torque changes will correct the error. More specifically, the program checks the algebraic sign of the encoder count difference, and sets the regulator polarity and value accordingly, then loops back to the start.

When a significant difference in encoder counts is found to have occurred, such that more than small torque changes are necessary, a check is made to determine if a zero crossing has occurred. If so, the torque polarity is reversed and the torque reduced by some amount. The torque is decrement value used was 0.707 times the original value, but dependant on the particular system other values may be more appropriate. After the torque is reversed and decremented, the program returns to the start. In some instances reversing and decrementing the torque is insufficient action to cause convergence. To insure convergence, only a finite number of loops after zero crossing is allowed. If the number of sequential zero crossings exceeds a preset amount, or if a significant error is detected when a zero crossing does not occur, the program branches to a more elaborate torque setting method. In this method, a value dependent upon the sign of the difference, the absolute difference, the time of the difference, and the algebraic change in the difference is used to selectively increment or decrement the torque applied to the motor. That is, the torque is set such that if the control motor is held stationary, the load motor will be driven in a direction such that the differences in motor encoder counts are driven to zero. This method may not always ensure rapid convergence, so the present difference is checked to see if the sign is changed from the last difference. That is, whether or not the present set torque value is sufficient to cause convergence. If not, The program branches to a subroutine which calculates a torque value based on load torque, rather than on present set torque values.

To ensure that the time increment doesn't elapse before the torque value is calculated, a longer time increment is set if these calculations are necessary. In some cases, the torque required to cause convergence might be greater than the maximum torque available from the motor. In this instance, a signal, which might be audible or an artificially induced vibration of the control motor, might be sent to the operator warning of this event.

Manipulator system forces can change by orders of magnitude when contacting an object. The above described five level intelligent servo system allows good tracking over the entire range of system forces encountered by the system.

The system forces are generally determined using accelerations and a set force. The system dynamics change when a gripped mass is added to the manipulator mass. For system forces to be accurately determined by this method the gripped mass must first be determined. A subroutine to accomplish this task is included in the loop to be called when appropriate.

Figure 20:
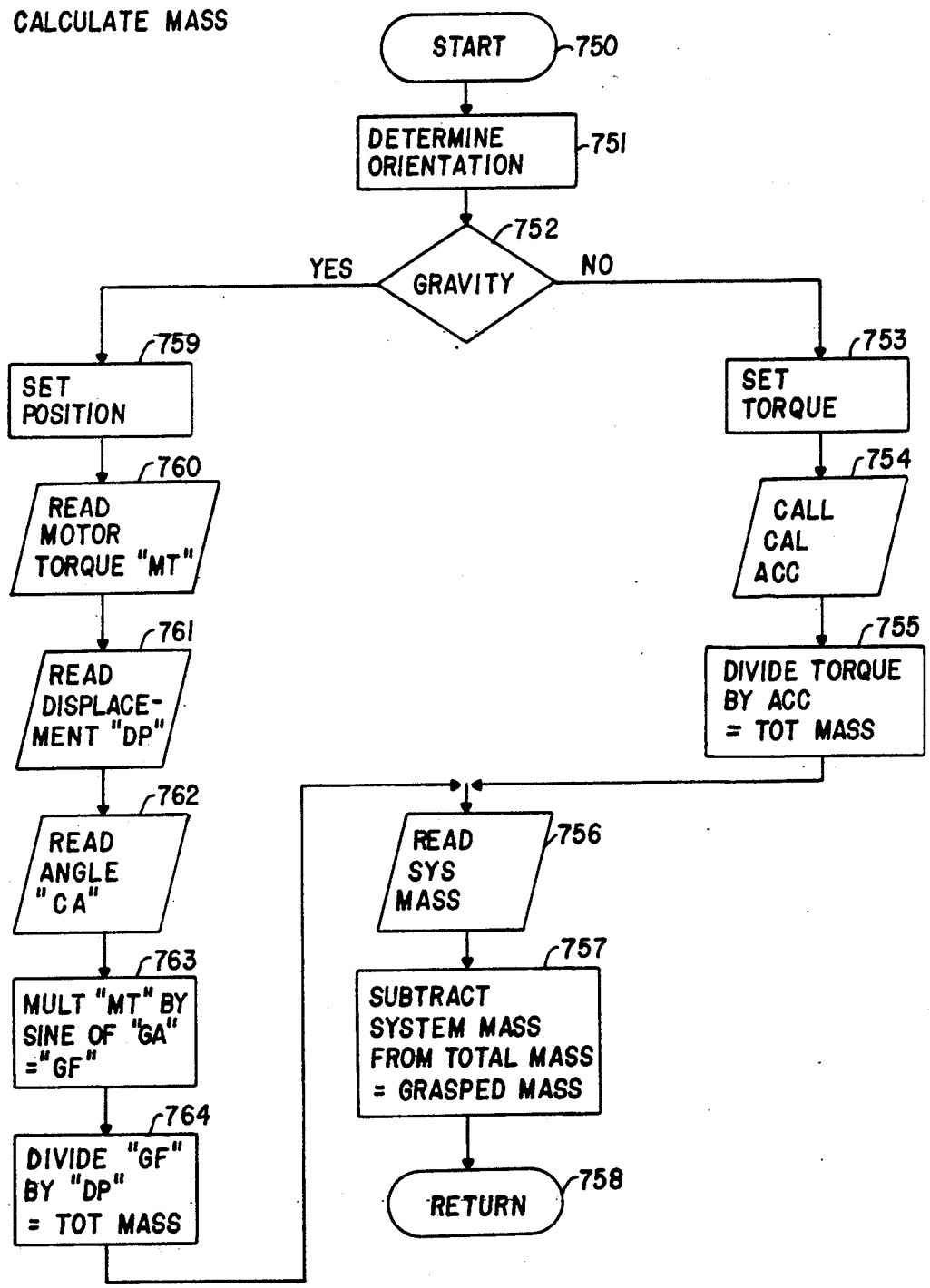
FIG. 20 is a flowchart illustrating the subroutine used to calculate unknown grasped masses.

FIG. 20 illustrates a subroutine which calculates the mass of a gripped object by dynamic weighing. The main operating loop is exited and control is passed to a dynamic weighing routine, wherein the weighing subroutine rather than the control motor controls the system for at least one plane of motion. Generally speaking, this will the first joint that moves rather than grips the external object. The subroutine starts at 750 and continues on to 751, where the orientation of the selected is determine with respect to gravity. Next at 752, a query checks as to whether or not gravitational effects need be considered. Generally this decision will be determined by the manipulator orientation but could also be set by circumstances where gravitational forces are not present such as in orbit. If the query result is no, the program continues on to 553, where a preprogrammed torque value is set to the selected load motor. Next at 754, the acceleration resulting from this torque value is determined using the calculate acceleration described earlier. Continuing on to 753, the subroutine divides the acceleration value determined at 755, by the torque value set at 753, to obtain the total mass. At 756, the system reads the previously calculated system mass, determined by the calibration procedure described earlier and subtracts this mass from the total mass. This yields the value of grasped mass at 757. Control is then returned to the main operating program at 758. If the query at 552 returns a yes, the program branches to 759 where the load is held in a fixed position by the force developed by the load motor. At 760, the motor torque needed to hold the grasped object is read. The forces needed to suspend the object in a stable position must equal the gravitational forces. The electromagnetic motor output is a torque, while the gravitational effect is a force. So at 761, the translation from the axis of rotation is determined. Continuing on to 762, the angle with respect to gravity is read and at 763 the value of motor torque 37 MT" is multiplied by the sine of the angle determined at 762 to yield the value "GF". At 764, the value "GF" is divided by the displacement value "DP" to value of total mass. The subroutine then goes to 756 and continues on as described previously.

Figure 21:
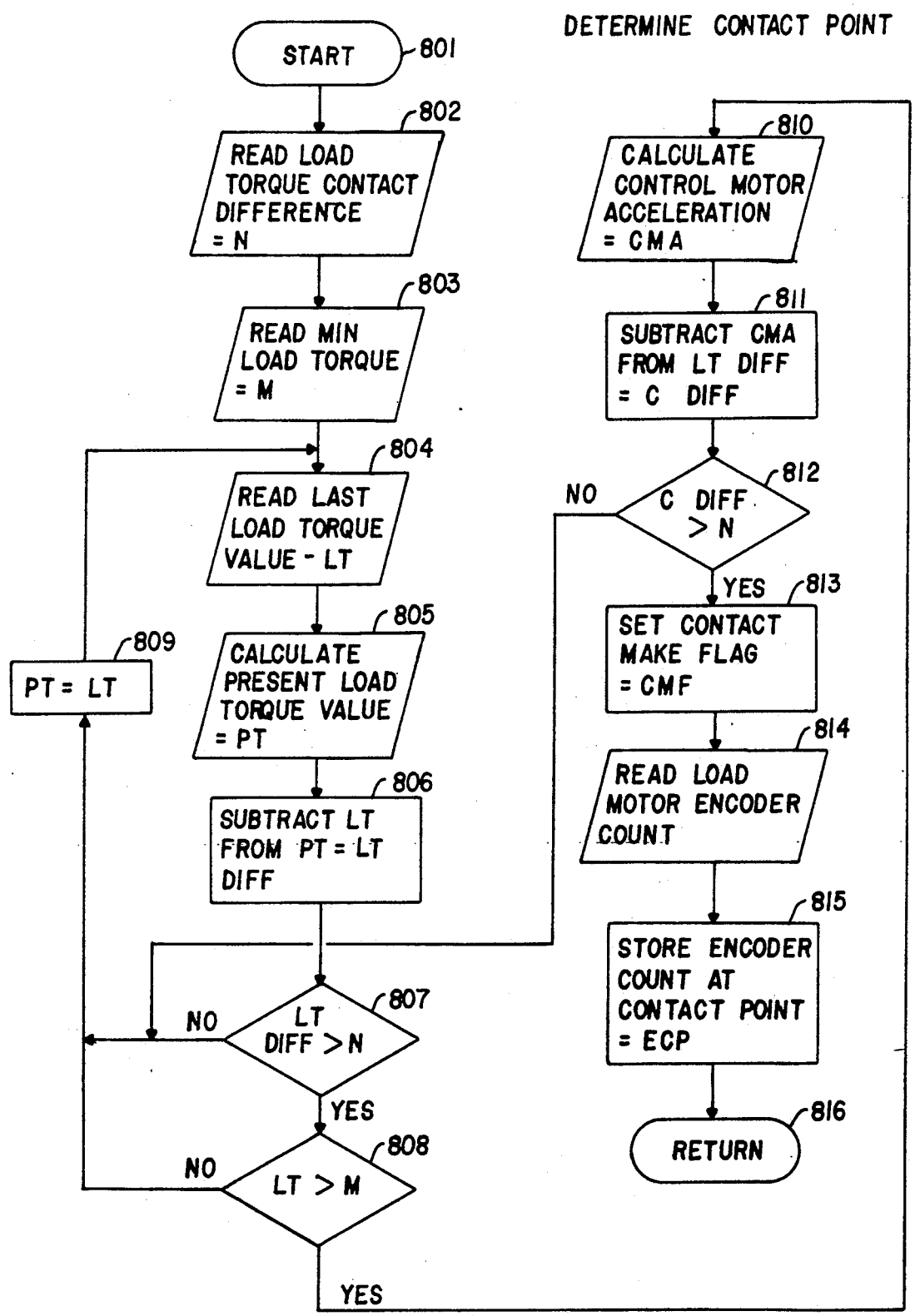
FIG. 21 is a flowchart illustrating a subroutine which determines when contact with an external object is made.

FIG. 21 is a flowchart that allows the system to determine when and where contact is made with a external object. This subroutine is intended to run in parallel with the aforementioned operating program. That is, this subroutine might run on either the host computer or another microcontroller connected such that the load motor encoder logic is accessed in real time. This subroutine could also be included as call in the main operating program described earlier. However, the control processor must have sufficient throughput, such that the time increment is not too long for good dynamic response.

The subroutine starts at 801 and continues on to 802, where "N", the load force difference indicating contact has been made, is read from memory. Next at 803, "M" the load torque value, which must be exceeded to indicate contact is also read from memory. At 804, the last value of load torque (LT) is read, while at 805, the present value of load torque (PT) is calculated. The subroutine then continues on to 806, where the last torque value is subtracted from the present torque value to yield the load torque difference (LT DIFF). At 807, a query is made as to whether the (LT DIFF) value is greater than "N". If the result is negative the program branches to 809, where the present torque is set to the last torque, then loops back to 804 and continues on as described previously. If the 807 query result is positive, the subroutine continues on to 808 where another query is made as to whether the last torque value is greater than "M". If the query result is negative the subroutine branches to 809 and continues on as previously described. If the 808 query result is positive, the subroutine continues on to 810, where the acceleration resulting from control motor action is calculated yielding the value (CMA). Next at 811 the (CMA) value is subtracted from the present value of load torque to determine the value of load torque not caused by inertial forces but by other causes such as contacting a load. This gives the value (C DIFF). Next at 812, (C DIFF) is compared with "N". If (C DIFF) is less than "N" the subroutine branches to 809 and continues on as previously described. If greater than "N" The subroutine continues on to 813 where contact make flag (CMF) is set. At 814, the encoder count where contact is made is read and at 815 this value is stored in permanent memory as the value (ECP) (encoder contact point). The subroutine then returns at 816.

As can been seen the flowchart of FIG. 18 describes a three step process. First changes in load induced forces, that is the total system forces minus the forces produced by the load motor, are compared with a preprogrammed limit. If the load forces exceed this limit, the magnitude of the load forces are also compared with a preprogrammed threshold. If the load forces exceed this limit, inertial forces caused by control commands are subtracted from the load forces and again compared with the first preprogrammed limit. If and only if, all three tests are successful, that is both an absolute and inertia corrected torque difference as well as torque magnitude, must exceed prestored limits. When this criteria is met, a contact make flag is set. Additionally, the encoder count value at the occurrence of contact is stored in memory.

Figure 22:
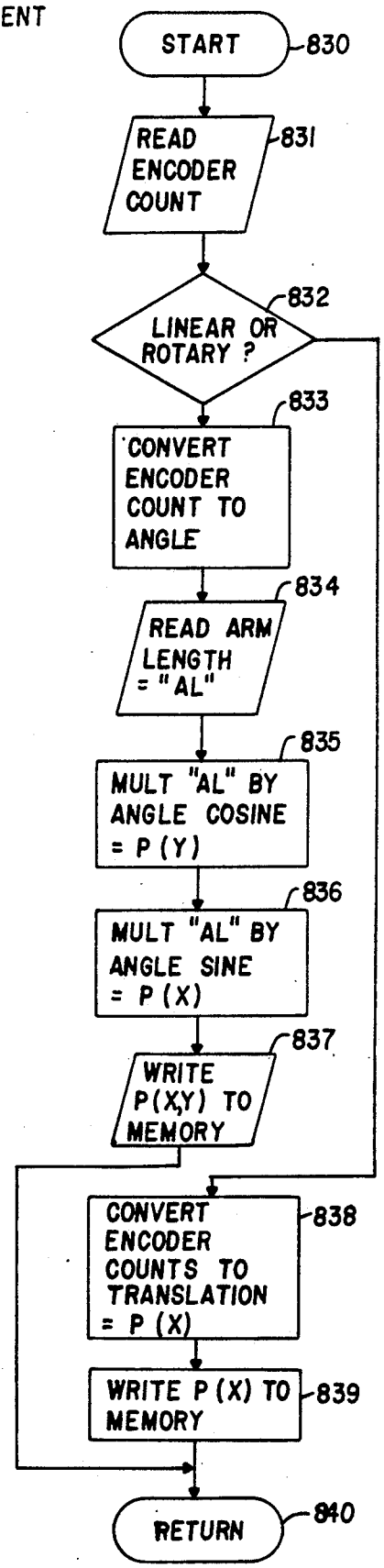
FIG. 22 is a flowchart illustrating a subroutine which converts encoder counts to cartesian coordinates points.

FIG. 22 is a flowchart illustrating a subroutine wherein the encoder counts are converted into distance points referenced to the origin of the motor shaft. For rotary motors, two position numbers are output, while for linear motors only one number is output. The subroutine begins at 830 and continues on to 831, where the encoder count is the load motor is read. At 832, a query asks whether or not the motor is rotary or linear. This query is a terminate and stay resident type commanded and once set at start up will not change until reset. If the query result is linear, the subroutine branches to 838. If the query result is rotary, the subroutine continues on to 833, where the encoder count is converged to an angle. Next at 834, the length of arm connected to the motor shaft is read from memory as the value "AL". Continuing on to 835, the value "AL" is multiplied by the cosine of the shaft angle to yield the (Y) coordinate of the plane in which the shaft rotates. AT 836, the value "AL" is multiplied by the sine of the shaft angle to yield the (X) coordinate of the plane in which the shaft rotates. The two coordinates of the position the manipulator end effector are read into memory as P(X,Y) at 837, the subroutine returns at 840. If the subroutine branches to 838, the encoder counts are converted to a distance referenced to the origin of the motor shaft, yielding the coordinate P(X). Continuing on to 839, P(X) is read to memory. Return to the calling program or subroutine occurs at 840. As can be seen this subroutine provides cartesian coordinate points to the host computer allowing distance measurements either on a continuous basis, or when an event such as contacting an external object occurs.

Figure 23:
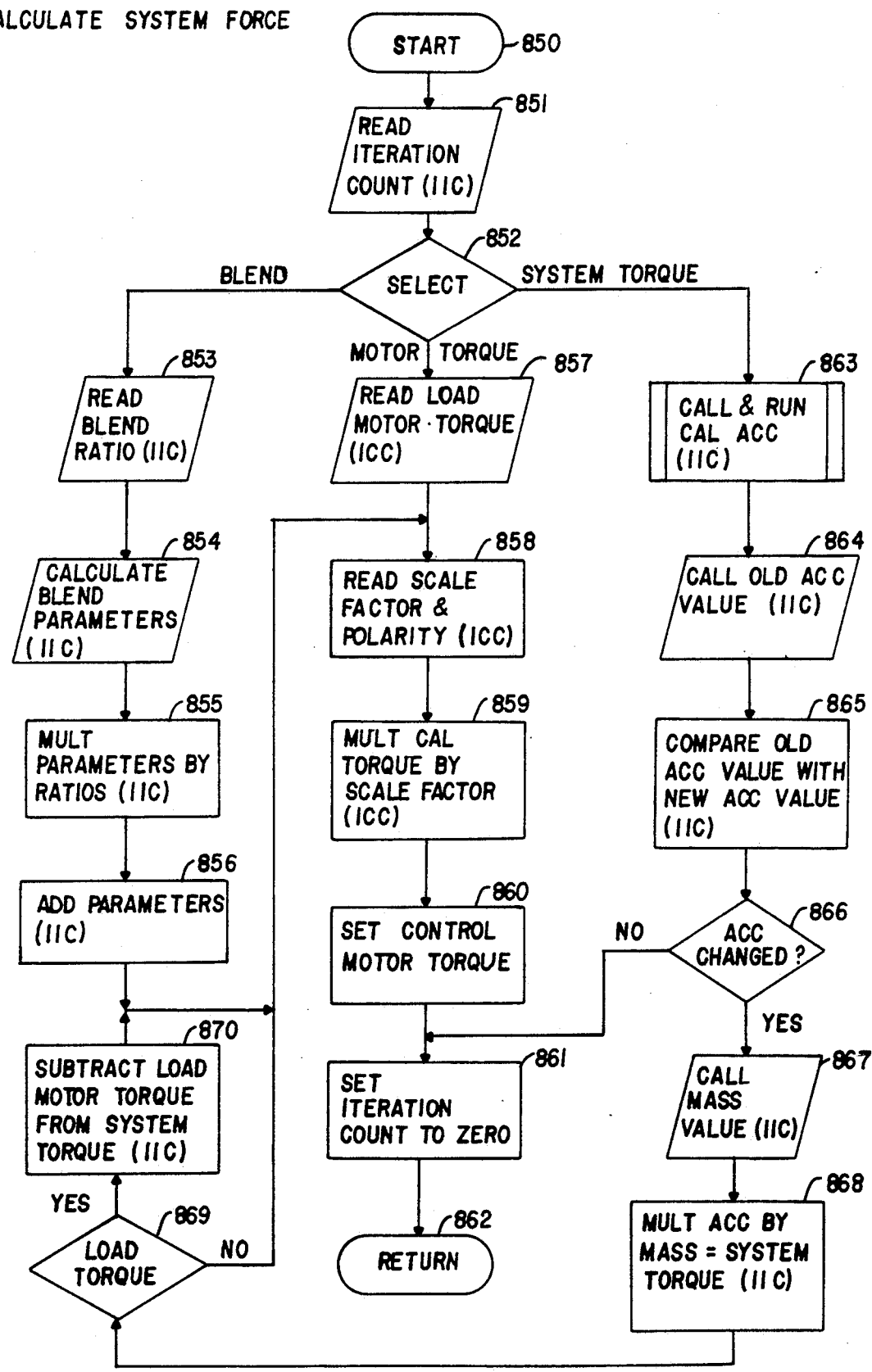
FIG. 23 is a flowchart illustrating the programming of the tactile feedback control subroutine.

FIG. 23 is a flowchart illustrating the subroutine which sets the control motor torque. This subroutine is structured to operate as a state machine. That is, generally this subroutine will be interrupted by a timed interrupt before completion. The main operating program will determine and set the load motor torque then return to the set control motor torque subroutine sequence at the state of interruption. Elaborating further, the subroutine increments a iteration count for each completed operation. Reading this count allows the subroutine to resume operations from the state where interrupted, rather than at the start of the sequence.

In some cases, single processor thru-put might not be sufficient for good transient response. For these situations, a separate processor, with parallel access to the load motor encoder and with the clock synchronized to the servo processor clock, might be used to set control motor torque. This allows parallel rather than sequential operation. This dual processor configuration significantly increases processor thru-put and decreases the total time needed to complete both load and control motor torque setting. For some applications, this dual processor configuration may be necessary for adequate transient response. In most applications, one processor will have sufficient thru-put for both operations and this configuration is used for the following description.

The subroutine starts at 850 and continues on to 851, where the iteration count is read from memory. At 852, a selection is made as to what criteria is used to set the control motor torque. This selection might be determined by user input, preprogrammed instructions, or by the occurrence of a event such as making contact with an external object. Four selections are available. The system/load torque selection provides tactile feedback forces using scaled values of either the system forces or the load forces. The system forces are the sum of all the forces acting upon the manipulator, while the load forces are the system forces minus the forces developed by the load motor. The subroutine determines these forces and sets the control motor torque to a scaled value of these forces. The motor torque selection sets a reversed scaled value of the load motor torque to the control motor.

The combination selection sets a control motor torque value based on selected percentages of multiple criteria. Elaborating further, when the acceleration is zero the system forces must be zero and so using this selection, no feedback force is set to the control motor unless the system is accelerating or decelerating. Using this criteria allows good representation of when events such as contacting an external surface occurs and also of system dynamics, but gives no information as to the magnitude of the forces output by the load motor. Using load motor forces gives good representation of what forces are output to the load but gives no information about forces developed by the load. Using load induced forces gives good representation of the forces developed by the load but no information as to what forces are output to the load by the load motor.

The system of the present invention allows the user to blend feedback criteria dependant upon personal preference and/or the particular task being performed. For example, while moving to manipulator to contact an object, system forces are highly important but it is also advantageous to feed the forces input to the motor. In this operation mode, the user might set a blend of 75% system forces and 25% load motor forces. Once contact is made with the external object, The system forces might not be as important as load forces. So, when the contact made flag is set, the system might switch to 90% load forces and 10% system forces.

If the velocity is zero, the system force measurement is indeterminate. That is the forces opposing movement are known to be larger and of opposite polarity than the motor output force, but how much larger is not known. This condition might occur when in contact with a highly rigid object. The velocity will also be zero when supporting a object in a set position against gravity wherein the load motor force represents all forces needed to support or weight the load. To provide useful tactile feedback when the velocity is zero, the system might automatically switch to the load motor torque selection when the zero velocity flag becomes active.

Once the feedback criteria is selected the subroutine branches to the appropriate operating sequence. If system/load torque is selected the subroutine branches to 863, where the calculate acceleration subroutine described earlier is called and then run to produce the present value of acceleration. Next at 864, the previously value of acceleration is called from memory. At 865, the previous and present acceleration values are compared to see if any difference has occurred. At 866, a query is made as to whether or not an acceleration difference was found. If the query result is negative, the subroutine branches to 861. Here the iteration counter is set to zero, and the subroutine continues on to 862, where control is returned to the main operating program described previously. If the 866 query result is positive, the subroutine continues on to 867, where the system mass value is called from memory. Next, at 868, the present acceleration is multiplied the by the system mass to yield the value of system torque. At 869, a query is made, asking if load rather than system torque, is wanted. If no, the subroutine branches to 858 and continues on. If the query result is yes, the subroutine branches to 870, where the load motor torque is subtracted from the system torque to yield load torque, then continues on to 858. If motor torque is selected at 852, the subroutine branches to 857, where the set value of load motor torque is read. At 858, the scaling factor, that is the percentage of the selected torque, to be applied to the control motor, is read. The polarity of the control motor feedback torque also is input at 858. Generally, the control motor torque is set to opposite polarity than the load motor torque if load motor torque is the feedback parameter. If using the system/load torque as a parameter, the control motor torque might be set to the same polarity. Continuing on to 859, the control motor torque value, determined by any of the selected methods, is multiplied by the scaling factor and set to the wanted magnitude and polarity at 860. At 861, the iteration count is set to zero. While at 862, the subroutine returns control to the main operating program. If the 852 selection is blend, the subroutine branches to 853, where the wanted blend ratio is read into memory. At 854, the blend component torques are calculated by branching to the appropriate sequence. For example, if system torque is a blend component, the subroutine would use the 863-868 sequence to determine this part of the blend, while if load motor torque is a blend component, the program would use the 857-858 sequence to determine the rest of the blend. Once the blend components are determined, at 855, each component is multiplied by the wanted ratio. At 856, these ratios are added together to determine the calculated control torque. Next the subroutine branches to 858, then continues on as described previously.

As can be seen the aforementioned flowcharts provide a method of accurately calibrating and setting the forces output by both the control motor and the load motor. Thus the microprocessor precisely measures and controls the force exerted against the load by the load motor and also provides for precise and selectable tactile feedback force to be developed by the control motor.

The system also provides adaptive control such that additional parameters, such as velocity, load forces, position or system forces can also be used in conjunction with the above parameters. These additional parameters might be used to scale the torque applied to the control motor, such that in appropriate instances, such as when grasping a external object, the holding torque developed by the load motor provides a continuous value of torque to the control motor proportional to the holding torque of the load motor when the velocity and encoder differences are both zero.

It is also possible to change the force ration between the load motor and control motor as a function of any or all of the control parameters described above.

In the above mentioned flow chart, the forces controlling the load motor are a function of the timed difference between the input of the operator and the ability of the load motor controller to react to that input. What this means is that generally speaking, the load motor forces are a function of the encoder count differences. That is, the zero reference is the control motor encoder count or preprogrammed instructions rather than a stationary reference. Therefore provision is made to reference the load motor encoder count to a zero reference by calling a special subroutine when needed.

Other methods may be utilized which are not dependent upon encoder count differences; for instance, a desired distance and acceleration parameter could be input to the system from prestored values and the only the forces necessary to accomplish these functions fed back to the operator.

Figure 24:
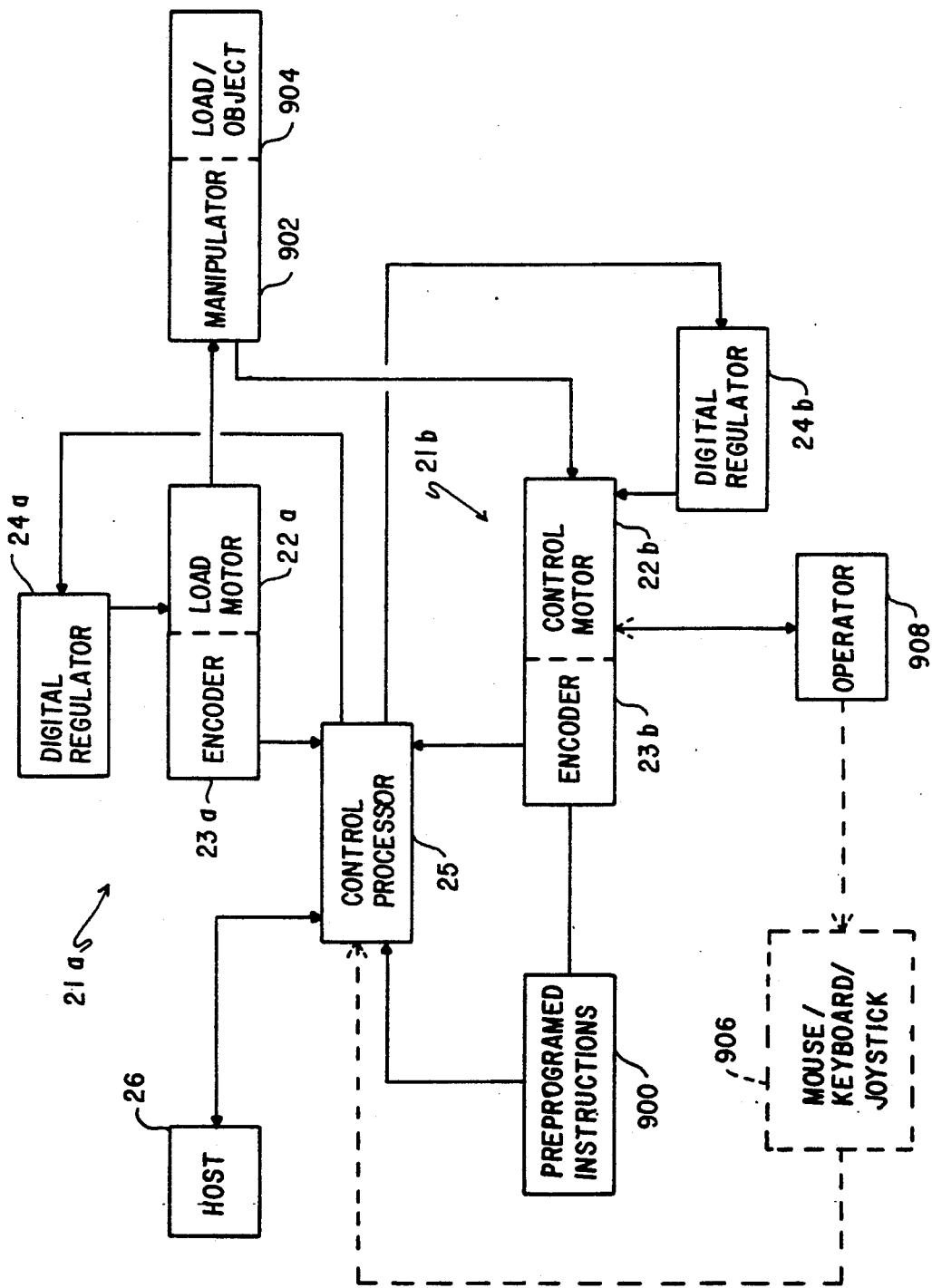
FIG. 24 is a block diagram of the system of the present invention illustrating alternative embodiments.

With reference to FIG. 24, some times the control motor might be used only for tactile feedback and the load motor controlled by preprogrammed instructions 900. As with other embodiments, the output of the load motor 22a is applied to a manipulator 902 that usually supports or moves a load or object 904. The control motor usually provides a timed sequence of numbers input from the shaft encoder. These time/number sequences might also be input by a device other than the control motor such as a keyboard, mouse or joystick 906. The selected feedback forces fed to the control motor are not coupled to the control motor movement. In some instances it is advantageous to use preprogrammed control.

In this mode of operation, the control motor provides only tactile feedback to the operator 908 as to the selected forces developed as a result of the preprogrammed movement instructions, rather than operator controlled movements.

Alternately, the control motor may be set to have zero velocity i.e. the shaft electrodynamically held in a constant position, and the forces the operator imparts to the shaft fed to the load motor as a force rather than position function. The movement of the load motor as a result of these forces could be fed back to the operator in visual form such as the graphical output of a computer video monitor.

The system of programmed operation of the system of the present invention regularly and periodically reads the value of each of the angular position encoders associated with each of the control and load motors and adjusts the current/voltage to each of the motors such that both motor shafts are driven to the same position. The control motor exerts a torque or resistance against the operator's actuation control as a preselected value selected from one of the following:

The amount of torque which is output by the load motor;

The total system forces developed while moving the manipulator;

The forces developed by the load while moving the manipulator;

A blend, consisting of selected ratios of these forces;

As can be seen, the various embodiment of the present invention overcome any of the shortcomings of prior art variable force and measurement and control system. It is thus believed that the construction and operation of the present invention will be apparent from the foregoing description. While the system shown described has been characterized as being preferred and in multiple embodiments, it will be obvious that various changes and modifications may be made therein without departing from the spirit and the scope of the invention as defined in the following claims.

What is claimed is:

1. A system for controlling movement of a manipulator using determined force-related parameters and adapted to move a load using the manipulator, comprising:

a manipulator adapted to be moved in a controlled manner;

load motor means operatively connected to said manipulator for causing movement thereof; and controlling means operatively connected to said load motor means for using at least two of the following force-related parameters: mass, distance moved, velocity and acceleration associated with at least one of said manipulator and said load motor means, in controlling said load motor means to cause movement of said manipulator, said controlling means including processing means wherein said force-related parameters are determined using said processing means, said determined force-related parameters being used in calculating a force-related magnitude wherein said force-related magnitude relates to at least one of the following: (a) total system forces developed while moving said manipulator, (b) a force outputted by said load motor means, (c) a force induced by the load while moving said manipulator, said controlling means further including means for changing the ratio of forces among: said total system forces, said force outputted by said load motor means and said load induced force to provide a desired blend of feedback force.

2. A system, as claimed in claim 1, wherein:
said controlling means includes control motor means for providing tactile feedback to an operator of the system.

3. A system, as claimed in claim 1, wherein:
said processing means includes programming means having preprogrammed instructions, said preprogrammed instructions and said force-related parameters for controlling said load motor means.

4. A system, as claimed in claim 2, wherein:
said control motor means includes encoder means for providing a magnitude relating to distance moved and said load motor means includes encoder means for providing a magnitude relating to distance moved and wherein said processing means determines a magnitude relating to a difference between said magnitudes of said encoder means of said control motor means and said encoder means of said load motor means and said difference is used in providing an input to said load motor means.

5. A system, as claimed in claim 1, wherein:
said means for changing includes programmed instructions and said programmed instructions are used to automatically change said control force ratio based on system parameter information including whether or not contact is made between said manipulator and the load.

6. A system, as claimed in claim 1, wherein:
said processing means having preprogrammed instructions for calibrating at least a first component of the system.

7. A system, as claimed in claim 6, wherein:
said first component includes said load motor means.

8. A system, as claimed in claim 1, wherein:
said processing means having preprogrammed instructions for determining the mass of the load operatively held by said manipulator.

9. An apparatus, as claimed in claim 1, wherein:
said processing means having preprogrammed instructions for causing substantial convergence between an output of said load motor means and information used by said processing means.

10. A system, as claimed in claim 9, wherein:
said controlling means includes control motor means and said information includes an output provided by said control motor means.

11. An apparatus, as claimed in claim 4, wherein:
said processing means includes programming means having preprogrammed instructions for causing a substantial convergence between an output of said control motor means encoder means and said load motor means encoder means.

12. A system, as claimed in claim 1, wherein:
said processing means having preprogrammed instructions for determining information relating to contact being made between said manipulator and the load.

13. A system, as claimed in claim 1, wherein:
said programming means determines a distance using movement of said load motor means.

14. A system, as claimed in claim 1, wherein:
movement of said manipulator is accomplished using at least one of manual operation and automatic operation.

15. A system, as claimed in claim 1, wherein said controlling means includes:
a plurality of moving actuator means;
support means engaging said plurality of actuator means; and
means for determining a magnitude relating to distance using at least the movement of one of said plurality of actuator means and at least portions of said support means.

16. An apparatus, as claimed in claim 15, wherein:
said plurality of actuator means includes at least a non-linear moving first piezo element.

17. A system, as claimed in claim 15, wherein:
said support means includes a number of levers operatively connected to each of said plurality of actuator mean wherein said levers are movable in response to movement of said actuator means.

* * * * *